United States Patent
Watanabe et al.

(10) Patent No.: US 9,467,682 B2
(45) Date of Patent: Oct. 11, 2016

(54) INFORMATION PROCESSING APPARATUS AND METHOD

(75) Inventors: Daisuke Watanabe, Yokohama (JP); Shinji Uchiyama, Yokohama (JP); Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 13/976,200

(22) PCT Filed: Dec. 22, 2011

(86) PCT No.: PCT/JP2011/080551
§ 371 (c)(1),
(2), (4) Date: Jun. 26, 2013

(87) PCT Pub. No.: WO2012/091144
PCT Pub. Date: Jul. 5, 2012

(65) Prior Publication Data
US 2013/0271577 A1  Oct. 17, 2013

(30) Foreign Application Priority Data
Dec. 28, 2010 (JP) ................................. 2010-293019

(51) Int. Cl.
G06T 15/00 (2011.01)
H04N 13/02 (2006.01)
G06T 7/00 (2006.01)

(52) U.S. Cl.
CPC ......... *H04N 13/0275* (2013.01); *G06T 7/0046* (2013.01); G06T 2207/10004 (2013.01); G06T 2207/10028 (2013.01)

(58) Field of Classification Search
CPC combination set(s) only.
See application file for complete search history.

(56) References Cited

U.S. PATENT DOCUMENTS
2004/0085320 A1* 5/2004 Kudoh et al. ............... 345/473

FOREIGN PATENT DOCUMENTS
JP  H07-287756 A  10/1995
JP  3253430 B2    2/2002

OTHER PUBLICATIONS

Savran et al., Bosphorus Database for 3D Face Analysis, Dec. 2008, Springer-Verlag Berlin Heidelberg, pp. 47-56.*
Costa et al., 3D Object Recognition and Pose with Relational Indexing, Dec. 2000, Academic Press, pp. 364-407.*

(Continued)

*Primary Examiner* — Barry Drennan
*Assistant Examiner* — Robert Craddock
(74) *Attorney, Agent, or Firm* — Canon USA, Inc. I.P. Division

(57) ABSTRACT

An information processing apparatus includes a model storing unit configured to store a three-dimensional form model for acquiring the position and posture of a measurement target object, an image acquiring unit configured to acquire an image of the measurement target object, a first position and posture acquiring unit configured to acquire a first position and posture of the three-dimensional form model in a first coordinate system on the basis of a first geometric feature of the three-dimensional form model and a first geometric feature within the image, and a second position and posture acquiring unit configured to acquire a second position and posture of the three-dimensional form model in a second coordinate system that is different from the first coordinate system on the basis of a second geometric feature of the three-dimensional form model and a second geometric feature within the image and the first position and posture.

18 Claims, 14 Drawing Sheets

(56) References Cited

OTHER PUBLICATIONS

Mauro S. Costa and Linda G. Shapiro, 3D Object Recognition and Pose with Relational Indexing, Computer Vision and Image Understanding, Sep. 2000, vol. 79 issue 3, pp. 365-368 and 379-393, Academic Press, Waltham, MA.

Alan. J. Vayda and Avinash C. Kak, A Robot Vision System for Recognition of Generic Shaped Objects, CVGIP: Image Understanding, Jul. 1991, 54(1):16-21, Academic Press, Orlando FL.

Susan J. Tate, Symmetry and Shape Analysis for Assembly-Oriented CAD, Ph.D Thesis, May 2000, pp. 49-122, Cranfield University, Cranfield, UK.

Georg Biegelbauer and Markus Vincze, Fast and Robust Bore Detection in Range Image Data for Industrial Automation, Proceedings of the 2nd International Symposium on 3D Data Processing, Visualization, and Transmission, Sep. 2004, pp. 526-533, IEEE, Piscataway, NJ.

W. Eric L. Grimson, Tomás Lozano-Perez, Norman Noble, and S.J. White, An Automatic Tube Inspection System That Finds Cylinders in Range Data, IEEE Computer Society Conference on Computer Vision and Pattern Recognition, Jan. 1993, pp. 446-452, 448-449, IEEE Computer Society, Los Alamitos, CA.

Susan J. Tate and Graham E. M. Jared, Recognising Symmetry in Solid Models, Computer Aided Design, Jun. 2003, 35(7):681-684, Elsevier B.V., Amsterdam, NL.

Changming Sun and Jamie Sherrah, 3D Symmetry Detection using the Extended Gaussian Image, The IEEE Transactions on Pattern Analysis and Machine Intelligence, Feb. 1997, 19(2):164-168, IEEE Computer Society, Los Alamitos, CA.

\* cited by examiner

INFORMATION PROCESSING APPARATUS AND METHOD

TECHNICAL FIELD

The present invention relates to a technology for acquiring the position and posture of a measurement target object having a three-dimensional form.

BACKGROUND ART

With the advance of robot technologies in recent years, robots have performed some complicated tasks, such as assembly of industrial products, instead of human beings. In order for a robot to hold and assemble a part with an end effector such as a hand, the measurement of relative positions/postures of the part to be hold and the robot (hand) may be required.

One method of measuring the position and posture of an object may use a feature detected from a gray image or color image (hereinafter, collectively called a two-dimensional image) photographed with a camera.

Alternatively, a three-dimensional form model of an object may be applied to distance data measured imagewise by a distance sensor. This scheme is called a model fitting.

In position and posture deduction by model fitting, the position and posture of some forms of objects may not be measured with high precision.

For example, the moments at the barycenter position and around the barycenter of an object which are calculated from distance data may be compared with a model. However, when the target object has an aspect ratio close to 1, it is difficult to deduct six parameters of a position and posture with high precision in a coordinate system of an image pickup apparatus.

PTL 1 discloses a method in model fitting to a depth map deduces position and posture parameters by a plurality of steps based on a coordinate system of an image pickup apparatus for higher stability and efficiency of the deduction.

PTL 1 discloses a method which deducts six degree-of-freedom components of a position and posture based on a coordinate system of an image pickup apparatus in order from a parameter which may be deducted with the highest precision and robustness. First, two parameters of rotation of an image coordinate axis of a captured image and one parameter of the position in the visual axis direction are deduced. Then, two parameters of the position perpendicular to the visual axis is deducted, one parameter of the rotation about the visual axis is deducted last. Dividing the parameter deduction procedure into steps allows measurement of the position and posture robustly and with high precision.

As pointed out in PTL 1, some objects may have degree-of-freedom components which are difficult to deduct for six degrees of freedom of a position and posture on the basis of an object (model) coordinate system. For example, some parts used in industrial products may have a nearly rotation symmetrical form and may have a minute notch for uniquely determining the posture component in the direction of rotation.

When the six parameters of the position and posture of such a part are attempted to deduct simultaneously by fitting between its image and a model, information lacks which contributes to the deduction of a specific degree of freedom component (in this case, the posture around the axis that defines the rotation symmetry of the model), compared with other degree-of-freedom components. This makes the deduction of the parameter in the direction of a specific degree of freedom difficult, resulting in low robustness and precision of the deducted position and posture.

PTL 1 discloses a method which deducts six degree-of-freedom components of a position and posture based on a coordinate system of an image pickup apparatus in order from a parameter which may be deducted with the highest precision and robustness. In other words, a specific degree-of-freedom component only is deducted separately on the basis of a model coordinate system. Except for the case where the rotation center axis of an object is matched with the visual axis of a used image pickup apparatus, the posture component around the rotation center axis of the object may not be deducted with high precision.

CITATION LIST

Patent Literature

PTL 1 Japanese Patent No. 03253430

SUMMARY OF INVENTION

The present invention has been made in consideration of the above situation, and has as its object to implement robust and highly precise measurement of a position and posture of an object having a parameter of a specific degree of freedom which is difficult to uniquely defined even within the degree of freedom of the position and posture based on a model coordinate system.

According to the present invention, the foregoing object is attained by providing an information processing apparatus including a model storing unit configured to store a three-dimensional form model for acquiring the position and posture of a measurement target object by position and posture matching with the measurement target object, an image acquiring unit configured to acquire an image of the measurement target object, a first position and posture acquiring unit configured to acquire a first position and posture of the three-dimensional form model in a first coordinate system on the basis of a first geometric feature of the three-dimensional form model and a first geometric feature within the image, and a second position and posture acquiring unit configured to acquire a second position and posture of the three-dimensional form model in a second coordinate system that is different from the first coordinate system on the basis of a second geometric feature of the three-dimensional form model and a second geometric feature within the image and the first position and posture.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Preferred embodiments of the present invention will be described in detail in accordance with the accompanying drawings.

First Embodiment

According to a first embodiment, the position and posture of an object which is substantially rotation symmetrical about a specific axis of the object and fewer feature for determination of the rotation about the axis is deducted. When six degree-of-freedom components of the position and posture of such an object are fairly handled to calculate the position and posture, the correct posture parameter around the rotation center axis of the object may not be acquired. According to this embodiment, the position and posture of six degrees of freedom is first calculated, and the posture parameter in a specific axial direction of the object is only separately deducted for advanced position and posture deduction. More specifically, a model may be applied to an edge on a two-dimensional image to calculate the position and posture of six degrees of freedom. Next, the posture around a specific axis is calculated on the basis of the position of a feature that defines the posture in the specific axial direction on the model coordinate system.

Figure 1:
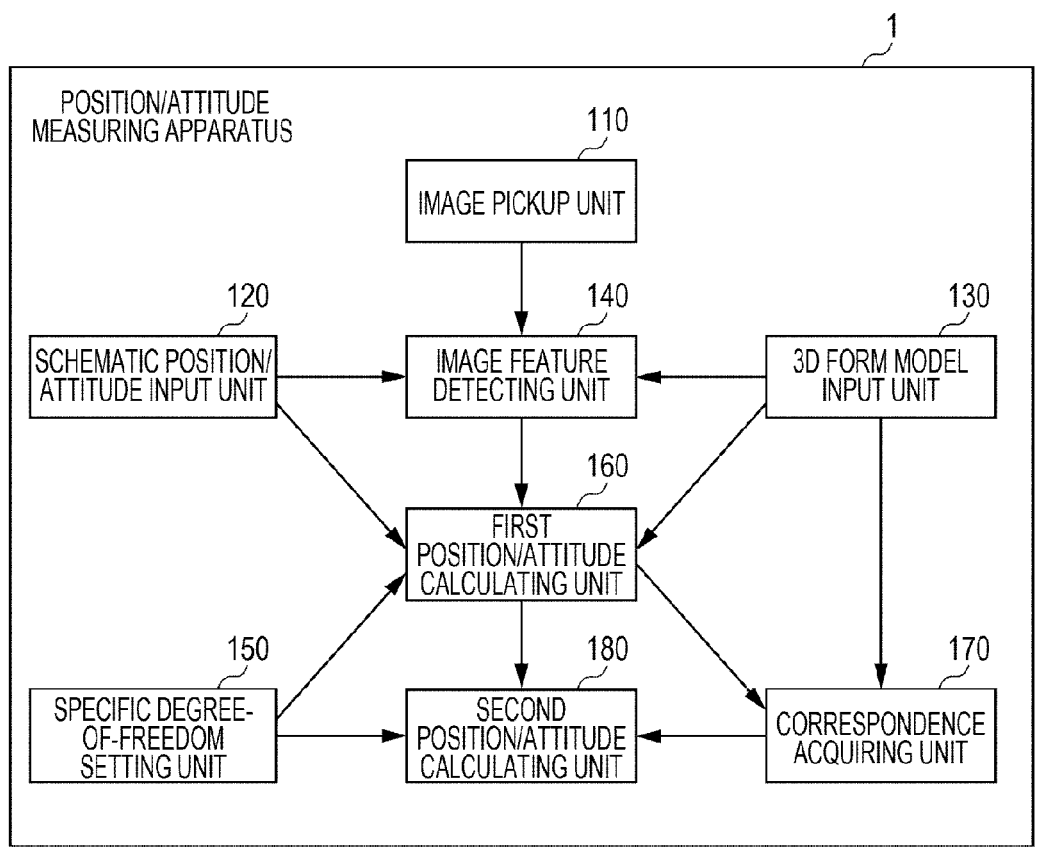
FIG. 1 illustrates the configuration of an information processing apparatus according to this embodiment.

FIG. 1 illustrates the configuration of an information processing apparatus that functions as a position and posture measuring apparatus 1 according to this embodiment. As illustrated in FIG. 1, the position and posture measuring apparatus 1 includes an image capturing unit 110, a schematic position and posture input unit 120, a three-dimensional form model input unit 130, an image feature detecting unit 140, a specific degree-of-freedom setting unit 150, a first posture calculating unit 160, a correspondence acquiring unit 170, and a second position and posture calculating unit 180. Components of the position and posture measuring apparatus 1 will be described below.

The image capturing unit 110 may be a camera and captures an image of an object to be measured (which will be called a measurement target object). The captured image is acquired by image acquiring unit. The internal parameters (focal length, main point Position, and/or lens distortion parameter) of the camera are calibrated in advance by a publicly known method.

The schematic position and posture input unit 120 inputs the schematic values of the position and posture of an object about the position and posture measuring apparatus 1. It is assumed that a three-dimensional coordinate system (basic coordinate system) on which the position and posture measurement are based is defined in the position and posture measuring apparatus 1. According to this embodiment, the camera center of the camera which is the image capturing unit 110 is defined as the origin, and an image coordinate system where the horizontal direction of an image is an X-axis, the vertical direction is as a Y-axis, and the light axis of the camera is Z-axis is defined as the basic coordinate system (first coordinate system). Similarly, a three-dimensional coordinate system (model coordinate system or second coordinate system) on which the position and posture measurement are based is also defined to the three-dimensional form model of the object.

The position and posture of an object about the position and posture measuring apparatus 1 represents the position and posture of the object on the reference coordinate system. According to this embodiment, the position and posture measuring apparatus 1 performs measurement serially in a time axis direction, and the previous (last time) measured values are used as a schematic position and posture. However, the scheme of inputting schematic position and posture values is not limited thereto. For example, on the basis of the past position and posture measurement result, the amount of changes in position and posture may be deducted. The present position and posture may be predicted from the past position and posture and the deducted amounts of change.

When substantial position and/or posture of an object are available in advance, the values are used as schematic values. The schematic position and posture are used for calculation of a first position and posture by the first position and posture calculating unit 160 which functions as first position and posture acquiring means.

Figure 2A:
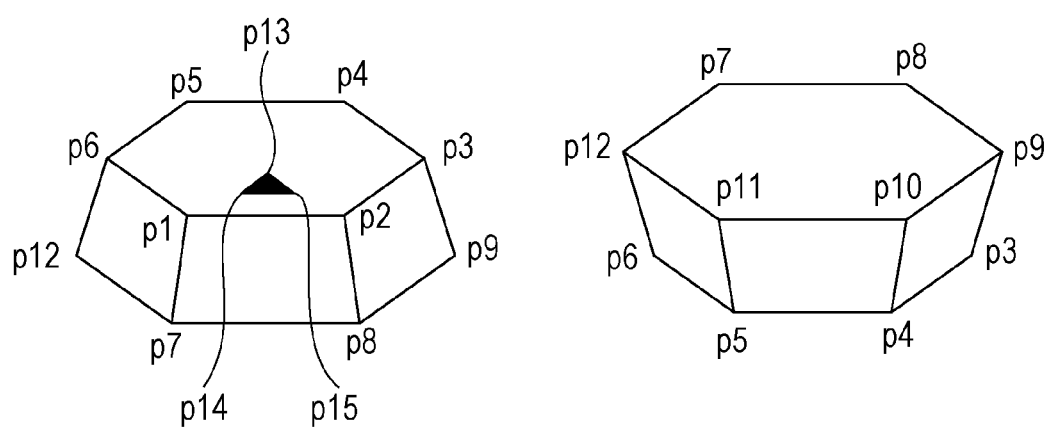
FIGS. 2A and 2B illustrate three-dimensional form models according to the first embodiment.
Figure 2B:
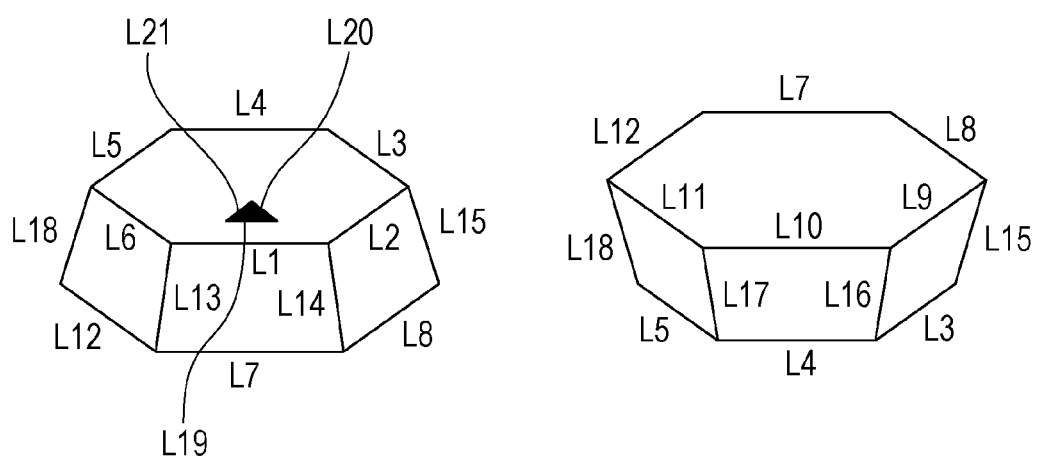

The three-dimensional form model input unit 130 inputs a three-dimensional form model for a target object the position and posture of which are to be measured by the position and posture measuring apparatus 1 from a model storing unit which stores a three-dimensional form model for acquiring the position and posture of the measurement target object by application of the position and posture to the measurement target object. FIGS. 2A and 2B illustrate three-dimensional form models according to this embodiment. The three-dimensional form model is defined by a set of points and a set of segments connecting the points. As illustrated in FIG. 2A, a three-dimensional form model for an observation target object includes 15 points of point P1 to point P15. As illustrated in FIG. 2B, the three-dimensional form model of the observation target object 10 includes segments L1 to L21. The point P1 to point P15 are represented by three-dimensional coordinate values. The segments L1 to L21 are represented by IDs of points included in the segments. The three-dimensional form model further stores information on a plane. Each plane is represented by the ID of the point included in the plane. The three-dimensional form model illustrated in FIGS. 2A and 2B stores information on eight planes forming the object. The three-dimensional form model is used for calculating a first position and posture of an object in the first position and posture calculating unit 160 and for calculating a second position and posture of the object in the second position and posture calculating unit 180 which functions as second position and posture acquiring means.

The image feature detecting unit 140 detects an image feature (geometric feature) of an image captured by the image capturing unit 110. According to this embodiment, an edge is detected as the image feature. More specifically, on the basis of schematic values of the position and posture of an object input from the schematic position and posture input unit 120, the segments of the three-dimensional form model are projected on the image, and the corresponding edges are searched in the vicinity of the projected segment. The image feature is used for calculating the first position and posture of the object in the first position and posture calculating unit 160.

The specific degree-of-freedom setting unit 150 sets components of the position and posture parameters deducted by the first position and posture calculating unit 160 and components of the position and posture parameters deducted by the second position and posture calculating unit. Hereinafter, the components of the position and posture parameters deducted by the first position and posture calculating unit 160 will be called first position and posture parameters, and the components of the position and posture parameters deducted by the second position and posture calculating unit 180 will be called second position and posture parameters.

More specifically, six parameters of the position and posture of an object based on the basic coordinate system are recorded as first position and posture parameters. Because the object form is substantially rotation symmetrical and has fewer feature s for determining the rotation around the axis are available, a parameter which is difficult to calculate among the six parameters are recorded as the second position and posture parameters in advance.

The first position and posture calculating unit 160 uses the image feature detected by the image feature detecting unit 140 to calculate the first position and posture of a measurement target object.

On the basis of the first position and posture, the correspondence acquiring unit 170 acquires the correspondence in geometric feature between the three-dimensional form model and the captured image, which supports the calculation of the second position and posture parameters. The acquired correspondence is used for deducting the second position and posture parameters in the second position and posture calculating unit 180.

On the basis of the first position and posture, the second position and posture calculating unit 180 uses the correspondence acquired by the correspondence acquiring unit 170 to calculate the second position and posture.

Figure 3:
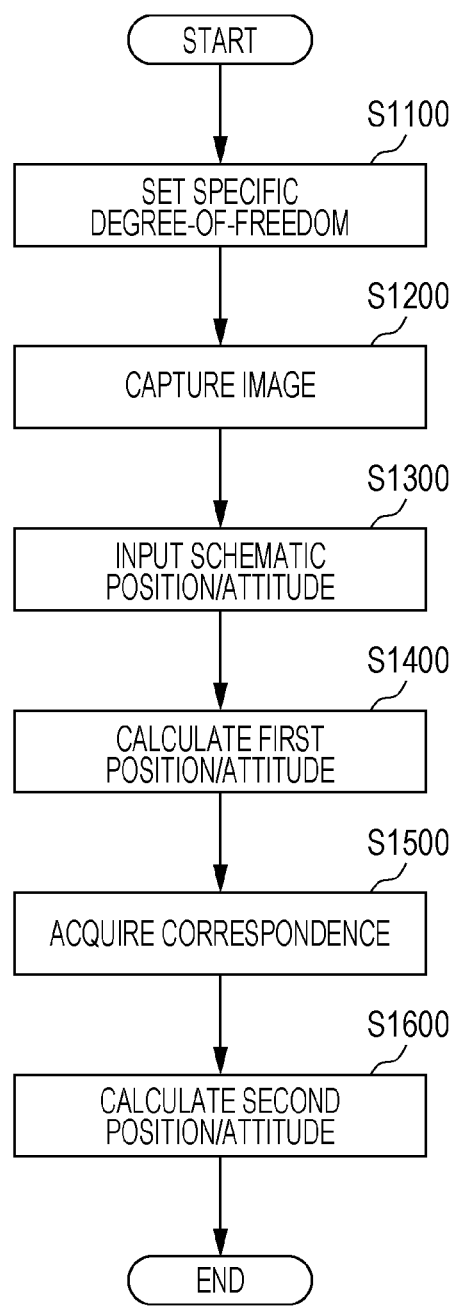
FIG. 3 is a flowchart illustrating a processing routine of measurement of a position and posture of an object according to the first embodiment.

FIG. 3 is a flowchart illustrating a processing routine of measurement of a position and posture of an object according to the first embodiment. The position and posture measuring apparatus 1 repeats a series of steps from step S1100 to step S1600 illustrated in FIG. 3 to measure the positions and postures serially in a time axial direction.
(Step S1100)

The specific degree-of-freedom setting unit 150 sets first position and posture parameters and second position and posture parameters.

Figure 4A:
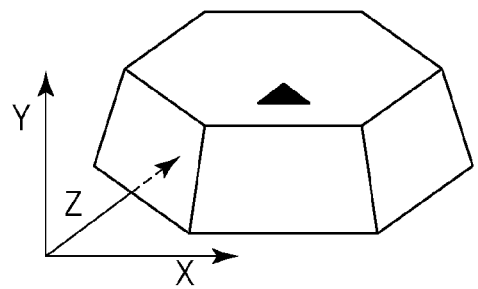
FIGS. 4A to 4C illustrate setting of first position and posture parameters and second position and posture parameters according to the first embodiment.

FIG. 4A illustrates a concrete example of a target object according to this embodiment and its model coordinate system.

According to this embodiment, as illustrated in FIG. 4A, it is assumed that an object has a form that is substantially rotation symmetrical to one axis. The axis for defining the rotation symmetry of an object (hereinafter, called a model center axis) is determined.

The model center axis may be set by input from a user, for example.

Figure 4B:
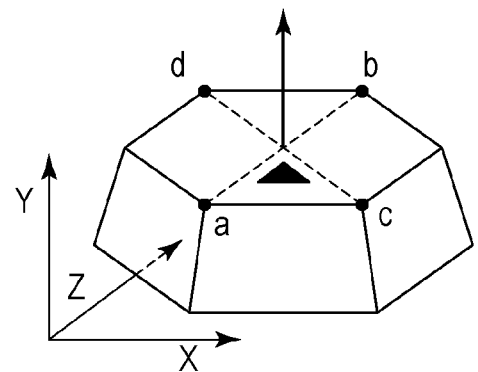

More specifically, for the model as illustrated in FIG. 4A, the opposing two pairs of two points a and b and c and d on the rotation symmetrical plane of the model are acquired as an input from a user. In this case, the vector passing through the intersection of the segment ab and segment cd and has the direction perpendicular to the square acbd is calculated as the model center axis (FIG. 4B). However, the setting scheme for the model center axis is not limited thereto. For example, for a rotation symmetrical form such as a triangle pole, three points on a rotation symmetrical triangle are acquired as an input from a user. The vector passing through the barycenter of the triangle formed by the three points and has the direction perpendicular to the triangle is calculated as the model center axis.

Alternatively, a rotation symmetrical plane (octagon in FIG. 4A) on the model face are acquired as an input from a user, and the straight line passing through the barycenter and being orthogonal to the input plane may be handled as the model center axis. Other schemes may be used which may calculate the rotation center axis that defines the rotation symmetry of a model form.

Figure 4C:
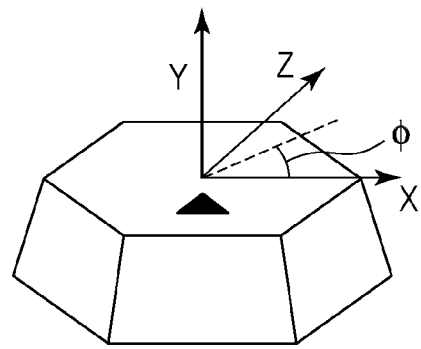

Next, two axes which are orthogonal to each other about the model center axis are set. Here, the model coordinate system is converted to a new model coordinate system (FIG. 4C) on which the model center axis and the set two axes are coordinate axes.

In this case, on the model coordinate system, the Y-axis (solid line) corresponds to the model center axis. However, the conversion scheme for the model coordinate system is not limited thereto. For example, the model coordinate system may be converted such that the X-axis may correspond to the model center axis. Other conversion schemes may be used unless the model coordinate system is converted such that the model center axis passes through the model origin. The following steps are performed by using the new model coordinate system. The position and posture of the object against the basic coordinate system are represented by six dimensional vector s=[tx, ty, tz, θ, φ, ψ]T where tx, ty, and tz represent position (translation) components in the X, Y, and Z-axis directions, respectively, and θ, φ, and ψ represent posture (rotation) components against the X, Y, and Z-axes. In consideration of the conversion sequence of the rotation components, the rotation about the object axis is separated in the coordinate conversion. The six parameters are recorded as first position and posture parameters. The rotation components about the coordinate axis corresponding to the model center axis are recorded as second position and posture parameters. According to this embodiment, because the Y-axis corresponds to the model center axis, φ that is a rotation component about the Y-axis is recorded as the second position and posture parameter.
(Step S1200)

The image capturing unit 110 captures a two-dimensional image of the measurement target object and inputs it to the image feature detecting unit 140.
(Step S1300)

The schematic values of the position and posture of the object against the position and posture measuring apparatus 1 are input from the schematic position and posture input unit 120 to the position and posture measuring apparatus 1. According to this embodiment, the position and posture measured last time are used.
(Step S1400)

Figure 5:
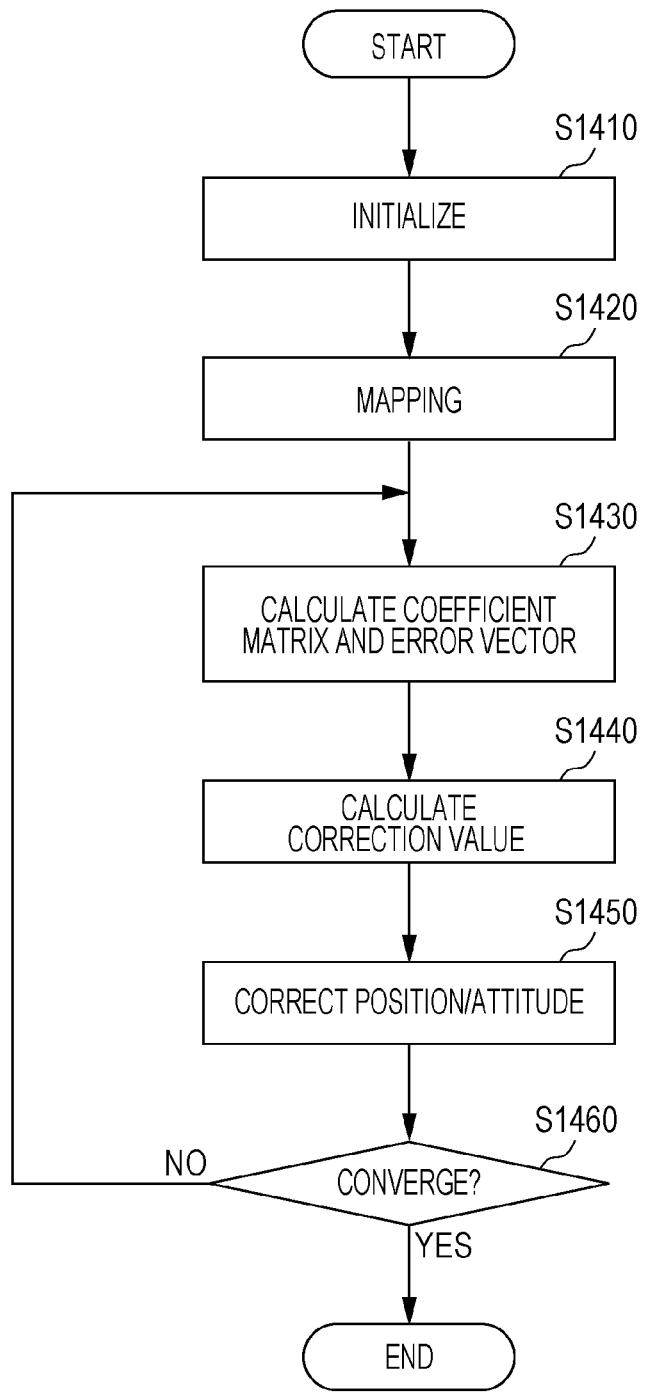
FIG. 5 is a flowchart of processing for first position and posture calculation in step S1400.

On the basis of the two-dimensional image information, the first position and posture parameters of the object are calculated. According to this embodiment, the position and posture of the measurement target object are calculated such that the projected images of the segments in the three-dimensional form model may fit to the edges that are features on the two-dimensional image. FIG. 5 is a flowchart describing a processing routine for first position and posture calculation in the step. The position and posture parameters s are optimized such that the sum of squares of distances between the edges detected on the image and the segments projected on the image on the basis of the deducted position and posture may be the lowest. In this case, the coordinate conversion based on the position and posture from the three-dimensional points Xm=[xm, ym, zm]T of the model coordinate system to the three-dimensional point Xc=[xc, yc, zc]T of the basic coordinate system are expressed as in Expression 1.

$$Xc = RXm + T \quad (1)$$

where R is a 3×3 matrix Represented by three components θ, φ, and ψ representing the posture of an object, T is s three-dimensional vector T=[tx, ty, tz]T including three components representing the position of a model. The amount of small change in position and posture of the object from the schematic position and posture is a six-dimensional vector Δs=[Δtx, Δty, Δtz, Δθ, Δφ, Δψ]T, and the amount of small change in posture represented by those components is ΔR, and the amount of small change in position is represented by ΔT. When the position and posture have a small change, the coordinate conversion from the three-dimensional points Xm=[xm, ym, zm]T of the object coordinate system to the three-dimensional point Xc=[xc, yc, zc]T of the basic coordinate system are expressed as in Expression 2.

$$Xc = R\Delta R \, Xm + T + \Delta T \quad (2)$$

In this step, the position and posture calculation is performed by acquiring the amount of small change Δs and repeating the processing of correcting the components. the processing routine for the position and posture calculation will sequentially be described below.

(Step S1410)
Initializing processing is performed. The schematic position and posture of a measurement target object acquired in step S1300 are input as schematic values in the position and posture calculation.

(Step S1420)
An image feature is detected on the two-dimensional image input in step S1200, and the image feature and the model are mapped. This step is performed in the image feature detecting unit 140.

According to this embodiment, an edge is detected as the image feature. The edge is a point where the concentration gradient has an extreme value. Detail description on the edge detecting method will be omitted because various methods have been proposed.

Figure 6A:
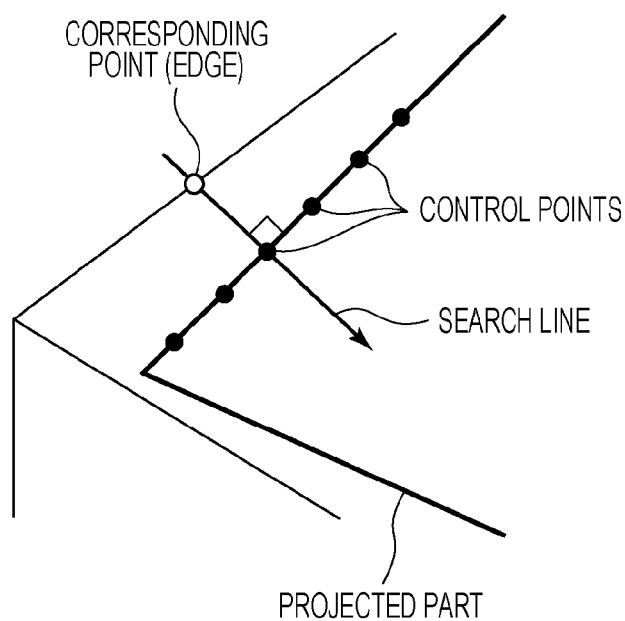
FIGS. 6A and 6B illustrate edge detection.
Figure 6B:
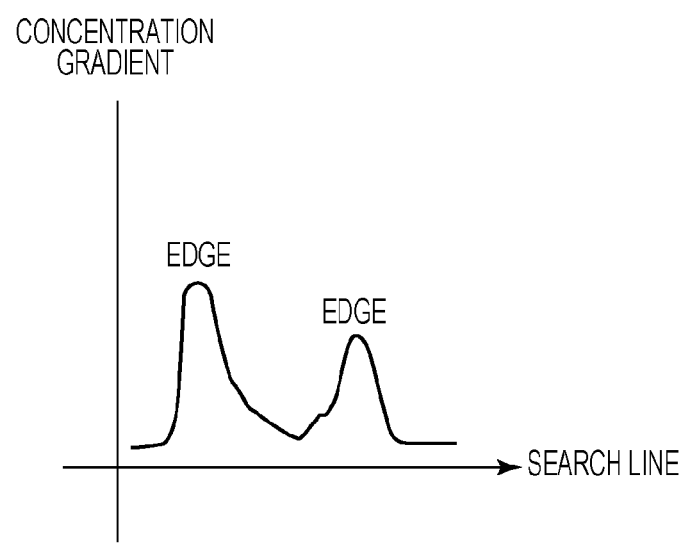

FIGS. 6A and 6B illustrate edge detections according to this embodiment. First, the schematic values of the position and posture of the measurement target object input in step S1300 and internal parameters of a calibrated camera are used to calculate the projected image of the segments forming the three-dimensional form model to the image. The projected images of the segments are also segments on the image. Next, control points are defined at equal intervals on the projected segments on the image, and one-dimensional edge detection is performed on the segment passing through any of the control points and being orthogonal to the projected segment (FIG. 6A). Because the edge is detected as an extreme value of the concentration gradient of the pixel value, a plurality of close edges may be detected, as illustrated in FIG. 6B. According to this embodiment, the edge having the highest concentration gradient among the detected edges is handled as the corresponding edge.

Figure 7:
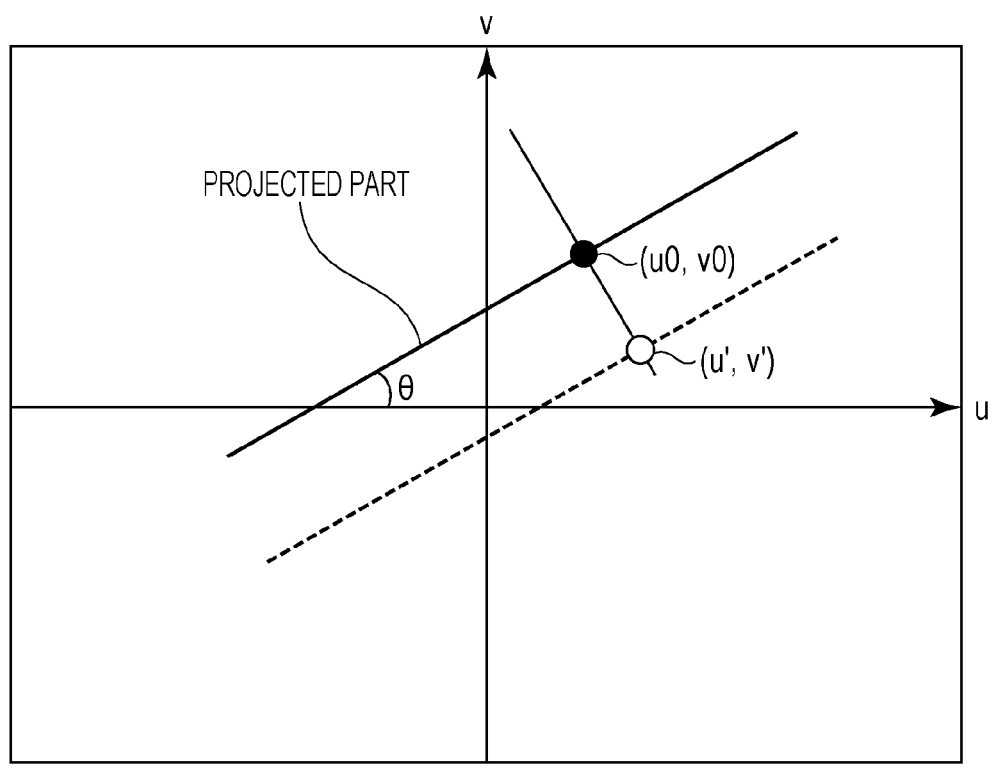
FIG. 7 illustrates a relationship between the projected image of the segment and the detected edge.

(Step S1430)
On the basis of the correspondence between the control point on the segment of the model and the edge on the image, a coefficient matrix and an error vector are calculated for calculating the position and posture. FIG. 7 illustrates a relationship between the projected image of the segment and the detected edge. In FIG. 7, the horizontal and vertical directions of the image are indicated as u-axis, and v-axis, respectively. The position on the image of one control point on the segment of the model projected on the basis of the schematic value s0 of the position and posture is represented as (u0,v0), and the inclination on the image of the segment to which the control point belongs to is represented by inclination θ about the u-axis.

The inclination θ is acquired by projecting the three-dimensional coordinate of both ends of the segment of the model to the image based on the schematic value (s0) of and calculating it as an inclination of the straight line connecting the coordinates of both ends on the image. The normal vector on the image of the segment results in (sin θ,−cos θ). The image coordinate of the corresponding point (edge) of the control point is (u',v'). In this case, the point (u,v) of the straight line (broken line in FIG. 7) passing through the point (u',v') and has an inclination θ may be expressed by Expression 3:

$$u \sin \theta - v \cos \theta = d \quad (3)$$

where θ is a constant and d=u' sin θ−v' cos θ (constant). The position on an image at the control point changes in accordance with the position and posture s of the measurement target object. Thus, the image coordinate (u,v) of the control point may be approximated by a primary Taylor expansion in the vicinity of (u0,v0), as in Expression 4.

[Math. 1]

$$u \approx u_0 + \sum_{i=1}^{6} \frac{\partial u}{\partial s_i} \Delta s_i \quad (4)$$

$$v \approx v_0 + \sum_{i=1}^{6} \frac{\partial v}{\partial s_i} \Delta s_i$$

where Δsi (i=1, 2, . . . , 6) represents a small change of any of components of s. In other words, Δs 1=Δtx, Δs 2=Δty, Δs 3=Δtz, Δs 4=Δθ, Δs 5=Δφ, and Δs 6=Δψ. Assuming that the position on an image of the control point acquired with the correct s is on the straight line expressed by Expression 1, the substitution of Expression 4 into Expression 3 may result on an observation equation (Expression 5).

[Math. 2]

$$\sin\theta \sum_{i=1}^{6} \frac{\partial u}{\partial s_i} \Delta s_i - \cos\theta \sum_{i=1}^{6} \frac{\partial v}{\partial s_i} \Delta s_i = d - r \quad (5)$$

where r=u0 sin θ−v0 cos θ (constant). The observation equation of Expression 5 may be formed for all mapped control points. In this case, because Expression 3 is an equation for a small change $\Delta s_i$ (i=1, 2, . . . , 6) of components of s, a linear simultaneous equation regarding $\Delta s_i$ expressed in Expression 6 may be formed.

[Math. 3]

$$\begin{bmatrix} \sin\theta_1 \frac{\partial u}{\partial s_1} - \cos\theta_1 \frac{\partial v}{\partial s_1} & \sin\theta_1 \frac{\partial u}{\partial s_2} - \cos\theta_1 \frac{\partial v}{\partial s_2} & \cdots & \sin\theta_1 \frac{\partial u}{\partial s_6} - \cos\theta_1 \frac{\partial v}{\partial s_6} \\ \sin\theta_2 \frac{\partial u}{\partial s_1} - \cos\theta_1 \frac{\partial v}{\partial s_1} & \sin\theta_2 \frac{\partial u}{\partial s_2} - \cos\theta_1 \frac{\partial v}{\partial s_2} & \cdots & \sin\theta_2 \frac{\partial u}{\partial s_6} - \cos\theta_2 \frac{\partial v}{\partial s_6} \\ \vdots & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \end{bmatrix} \quad (6)$$

In this case, the image coordinates u and v in a normalized image coordinate system may be expressed by u=xc/zc and v=yc/zc, respectively. Thus, from u and v calculated on the basis of Expression 2, the elements of the matrix on the left-hand side are calculated. The linear simultaneous equation is expressed by Expression 7.

$$J1\Delta s = E \quad (7)$$

J1 of the left-hand side is a coefficient matrix to be acquired, and E of the right-hand side is an error vector.

(Step S1440)

On the basis of Expression 5 and by using the generalized inverse matrix $(J1^T*J1)-1*J1^T$ of the matrix J1, the correction value $\Delta s$ for the position and posture are acquired with a least square criterion. However, edge correspondence may often be wrong (outlier), the robust deduction method as will be described below may be used. Generally, the value of the error vector of right-hand side of Expression 4 is high at an edge that is an outlier.

Accordingly, a small weight is given to the data having a high absolute value of the error, and a large weight is given to data having a small error to suppress the influence of data having a large error. The weight may be given by Tukey's function of as expressed by Expression 8, for example.

[Math. 4]

$$w(d-r) = \begin{cases} \left(1 - \left(\frac{d-r}{c_1}\right)^2\right)^2 & |d-r| \le c_1 \\ 0 & |d-r| > c_1 \end{cases} \quad (8)$$

where c 1 is a constant. The function to give a weight is not required to be the Tukey's function but may be any function, such as Huber's function, which gives a small weight to data having a large error and gives a large weight to data having a small error. The weight corresponding to measured data is wi. In this case, the weight matrix W is defined as in Expression 9.

[Math. 5]

$$W = \begin{bmatrix} w_1 & & 0 \\ & w_2 & \\ & & \ddots \\ 0 & & \end{bmatrix} \quad (9)$$

The weight matrix W is a square matrix containing all zeros except for an orthogonal component and contains the weight wi for the orthogonal component. The weight matrix W may be used to deform Expression 7 as in Expression 10.

$$WJ\Delta s = WE \quad (10)$$

Solving Expression 10 as in Expression 11, for example, results in a correction value $\Delta s$.

$$\Delta s = (J_1^T W J_1)^{-1} J_1^T W E \quad (11)$$

(Step S1450)

With the position and posture correction value $\Delta s$ calculated in step S1440, the schematic value is corrected.

$$s \leftarrow s + \Delta s$$

(Step S1460)

A convergence test is performed thereon. If it has been converted, the processing exits. Otherwise, the processing returns to step S1420. The convergence test determines the convergence has been acquired if the correction value $\Delta s$ is substantially equal to 0 or if the sum of squares of the error vector does not change very much between before and after correction.

This processing updates the schematic values of the position and posture input in step S1300 by using information on the two-dimensional image. The position and posture calculated finally by this step are defined as the first position and posture.

(Step S1500)

On the basis of the first position and posture, the coordinates (image feature) on the two-dimensional image corresponding to the point (model feature) on the three-dimensional form model face is acquired. In this step, the feature correspondence defining the posture in a specific axial direction on the model coordinate system is acquired separately to allow calculation of the posture about the specific axis with high precision.

First, a geometric feature contributing to the calculation of parameters in a specific degree of freedom direction is selected from the plane of the three-dimensional form model, and the three-dimensional coordinate is recorded. In the model illustrated in FIGS. 2A and 2B, p13 to p15 are features that uniquely define parameters in a specific degree of freedom direction. This model feature selection is performed offline as preparation before step S1100.

In this case, by using a tool being capable of observing a three-dimensional form model with a free posture, a geometric feature which supports unique identification of a parameter in a specific degree of freedom direction and is manually designated may be recorded as preparation and may be read by step S1100.

Alternatively, the geometric feature may be designated online through manual input. In this case, from the three-dimensional form model rendered on the image captured on the basis of the first position and posture, a pixel rendering a geometric feature which supports unique identification of a parameter in a specific degree of freedom direction of the model is manually designated. A model feature may be acquired by acquiring the three-dimensional coordinates on the model face rendered at the designated pixel.

Next, the image feature corresponding to the model feature is determined from the captured image. More specifically, on the basis of the first position and posture, the three-dimensional form model and the selected model feature are rendered. The image and the captured image are compared, and the pixel corresponding to the model feature is manually designated on the captured image to acquire an image feature. However, the scheme for acquiring correspondence between a model feature and an image feature is not limited thereto. For example, the image pattern of a region corresponding to a model feature may be prepared as a template and be applied pattern matching with the captured image to acquire the corresponding image feature. More specifically, first, a three-dimensional form model and the three-dimensional coordinates of a feature which supports unique identification of a posture of a model may be stored in advance and be read as a model feature. Furthermore, the posture of a target object against an image pickup apparatus may be changed, and its images may be photographed from a plurality of viewpoints in advance. Then, a plurality of pattern images of a region around the model feature may be held. By performing pattern matching between the captured image and pattern images, the position of the most similar pixel may be acquired, and the corresponding image feature may thus be acquired. In this case, on the basis of the first position and posture, the pattern matching may be performed by using as a candidate a pattern image resulting from photographing of an object having a posture rotated in a specific degree of freedom direction for efficiently searching an image feature.

By performing this processing, the image feature corresponding to a model feature may be acquired. At least one correspondence between a model feature and an image feature may be required, but the processing may be performed on a plurality of model features to acquire a plurality of correspondences.

(Step S1600)

The first position and posture calculated in step S1400 is expected to be correct except for the parameter $\phi$ regarding the specific degree of freedom. In this step, the parameter $\phi$ regarding a specific degree of freedom is only optimized by using the first position and posture as a schematic position and posture, and the position and posture are then calculated.

When the first position and posture are a schematic position and posture, the relationship of Expression 5 is satisfied, as in step S1400. Here, a 3×3 matrix Representing a small rotation of $\Delta\phi$ in the Y-axis direction with reference to a model coordinate system is $\Delta Ry$. In this case, the coordinate conversion from a three-dimensional point $Xm=[xm, ym, zm]T$ of the object coordinate system to the three-dimensional point $Xc=[xc, yc, zc]T$ of the basic coordinate system when the first position and posture undergoes small rotation by $\Delta\phi$ in the Y-axis direction of the model coordinate system may be expressed by Expression 12.

$$Xc = R\Delta Ry\, Xm + T \quad (12)$$

Accordingly, this step acquires the amount of small change $\Delta\phi$ and corrects the Y-axis direction of rotation of the model to calculate the position and posture.

Figure 8:
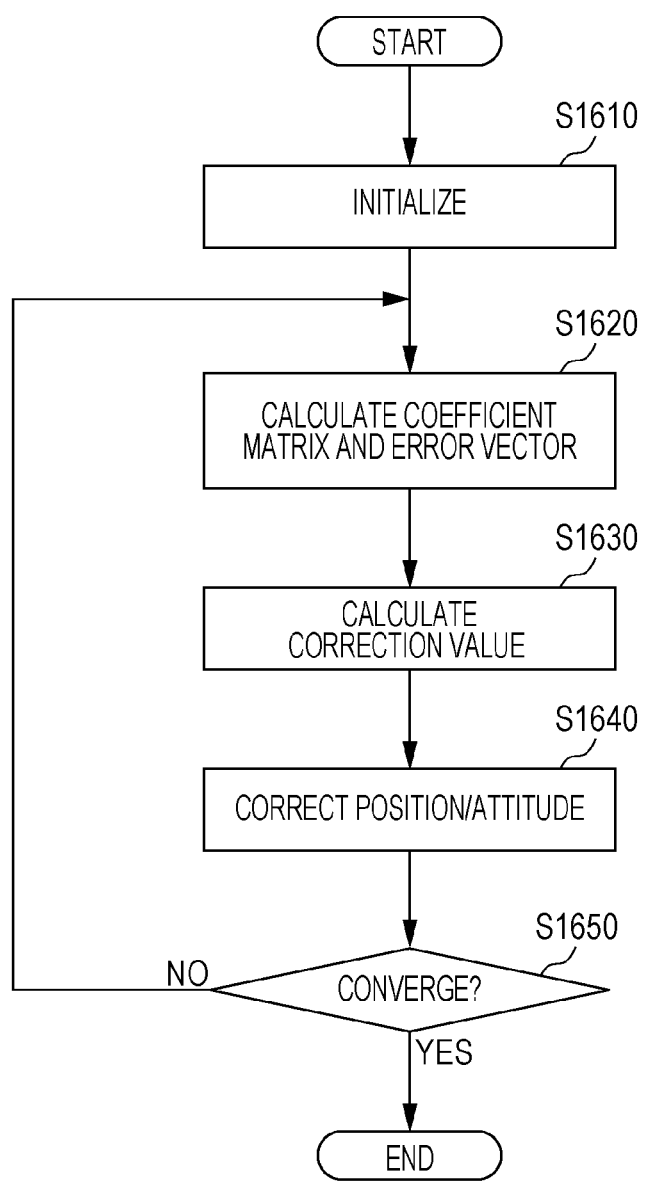
FIG. 8 is a flowchart of processing for second position and posture calculation in step S1600.

FIG. 8 is a flowchart illustrating a processing routine for second position and posture calculation in this step. Here, the position and posture are optimized such that the sum of squares of the distance between the coordinates of a feature detected on an image and coordinates of a model feature projected on the image on the basis of the first position and posture may be the lowest.

(Step S1610)

Initializing processing is performed. Here, the first position and posture acquired in step S1400 are input as schematic values of the position and posture calculation.

(Step S1620)

Figure 9:
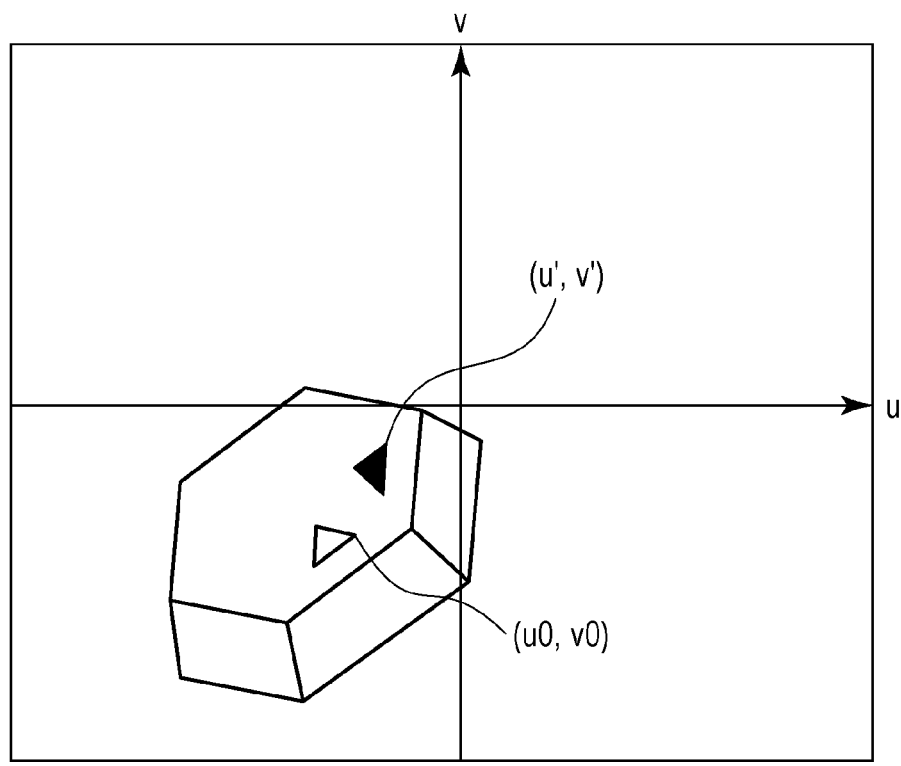
FIG. 9 illustrates a relationship between a projected image of a model feature and the associated image feature.

On the basis of the correspondence between the model feature and the image feature, a coefficient matrix and an error vector for calculating a position and a posture are calculated. FIG. 9 illustrates a relationship between a projected image of a model feature and the associated image feature. In FIG. 9, the horizontal direction and vertical direction of an image are u-axis and v-axis, respectively. The position of the model feature on the image projected on the basis of the schematic values $\phi 0$ of the position and posture is represented as (u0,v0). The image coordinates of the image feature corresponding to the model feature are (u',v'). Here, the position of the model point on the image changes in accordance with the small change $\phi$ of the measurement target object. Thus, the coordinates (u',v') of the model feature projected on the screen may be approximated by a primary Taylor expansion in the vicinity of (u0,v0), as in Expression 13.

[Math. 6]

$$u' \approx u_0 + \frac{\partial u}{\partial \phi}\Delta\phi$$
$$v' \approx v_0 + \frac{\partial v}{\partial \phi}\Delta\phi \quad (13)$$

where $\Delta\phi$ represents a small change in the axial direction designated by $\phi$.

Forming and organizing the observation equation in Expression 13 with respect to all mapped points data, Expression 14 may be acquired.

[Math. 7]

$$\begin{bmatrix} \frac{\partial u_1}{\partial \phi} \\ \frac{\partial v_1}{\partial \phi} \\ \vdots \end{bmatrix} \Delta\phi = \begin{bmatrix} u'_1 - u_{10} \\ v'_1 - v_{10} \\ \vdots \end{bmatrix} \quad (14)$$

where ui' and vi' are two-dimensional coordinates of the projected model feature, and ui 0 and vi 0 refer to two-dimensional coordinates of the image feature corresponding to the model feature (i=1 . . . , n, and n: the number of features). Here, the value of the matrix of the left-hand side may be expressed as follows. First, the rotation matrix R of a rotation $\alpha$ about the rotation center axis vector [ux, uy, uz]T may be expressed by Expression 15.

[Math. 8]

$$r = \begin{bmatrix} u_x^2 + (1-u_x^2)c & u_x u_y(1-c) - u_z s & u_x u_z(1-c) + u_y s \\ u_x u_y(1-c) + u_z s & u_y^2 + (1-u_y^2)c & u_y u_z(1-c) - u_x s \\ u_x u_z(1-c) - u_y s & u_y u_z(1-c) + u_x s & u_z^2 + (1-u_z^2)c \end{bmatrix} \quad (15)$$

where c=cos α and s=sin α. Here, on the basis of the fact that cos α≈1 and sin α≈α when α is minute, the matrix ΔRy of a small rotation about the Y-axis may be approximated by Expression 16.

[Math. 9]

$$\Delta R_y = \begin{bmatrix} 1 & 0 & \phi \\ 0 & 1 & 0 \\ -\phi & 0 & 1 \end{bmatrix} \quad (16)$$

where [ux, uy, uz]T=[0, 1, 0]T. On the basis of this, Expression 12 may be expressed as in Expressions 17 and 18.

[Math. 10]

$$\begin{bmatrix} x_c \\ y_c \\ z_c \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} 1 & 0 & \phi \\ 0 & 1 & 0 \\ -\phi & 0 & 1 \end{bmatrix} \begin{bmatrix} x_m \\ y_m \\ z_m \end{bmatrix} + \begin{bmatrix} T_x \\ T_y \\ T_z \end{bmatrix} \quad (17)$$

[Math. 11]

$$\begin{bmatrix} x_c \\ y_c \\ z_c \end{bmatrix} = \begin{bmatrix} (r_{11} - r_{13}\phi)x_m + r_{12}y_m + (r_{11}\phi + r_{13})z_m + T_x \\ (r_{21} - r_{23}\phi)x_m + r_{22}y_m + (r_{21}\phi + r_{23})z_m + T_x \\ (r_{31} - r_{33}\phi)x_m + r_{32}y_m + (r_{31}\phi + r_{33})z_m + T_x \end{bmatrix} \quad (18)$$

The image coordinates u and v may be expressed as u=xc/zc and v=yc/zc, respectively. Thus, they are partially differentiated by ϕ to calculate the respective values. The linear simultaneous equation of Expression 14 having calculated the matrix components may be expressed as in Expression 19.

$$J2\Delta\phi = E2 \quad (19)$$

J2 of the left-hand side is a coefficient matrix to be acquired, and E2 of the right-hand side is an error vector.
(Step S1630)

The generalized inverse matrix (J2T*J2)−1*J2T of the matrix J2 is used to solve Expression 19 like Expression 20 and acquire the correction value Δϕ for the position and posture with a least square criterion.

$$\Delta\phi = (J2T*J2)-1*J2TE2 \quad (20)$$

(Step S1640)

With the correction value Δϕ for the position and posture calculated in step S1630, the schematic values of the position and posture are corrected.

$$\phi \leftarrow \phi + \Delta\phi$$

(Step S1650)

A convergence test is performed thereon. If it has been converted, the processing exits. Otherwise, the processing returns to step S1620. The convergence test determines the convergence has been acquired if the correction value Δϕ is substantially equal to 0 or if the sum of squares of the error vector does not change very much between before and after correction.

As described above, the first embodiment deducts the position and posture of an object having a rotator form or rotation symmetrical form about a specific axis. First, the edge correspondence between a model and an image is used to deduct the position and posture of the object once. Then, the feature correspondence between the model and the image is used to minimize the two-dimensional distance on the image and thus perform registration limited to the specific axis rotation direction of on the model.

The deduction of the model rotated in a specific axis direction only at a later stage allows robust and highly precise measurement of the position and posture even of an object having parameters which are difficult to acquire because of similar forms in a specific degree of freedom direction.

Second Embodiment

According to the first embodiment, the first position and posture calculation optimizes six degree-of-freedom parameters of an object first, and the second position and posture calculation then optimizes the Y-axis rotation parameter only on the model coordinate system which is a specific degree of freedom. On the other hand, according to this embodiment, the first position and posture calculation only optimizes five degree-of-freedom parameters excluding a Y-axis rotation component of a model coordinate system. Reducing the number of degree-of-freedom components which are difficult to deduct in the first position and posture calculation may reduce the amount of calculation for more efficient position and posture calculation. Because the fundamental configuration according to this embodiment is the same as that of the first embodiment, the description will be omitted. Processing units of this embodiment will be described below.

Because the image capturing unit 110, schematic position and posture input unit 120, three-dimensional form model input unit 130, image feature detecting unit 140, first posture calculating unit 160, correspondence acquiring unit 170, and second position and posture calculating unit 180 are the same as those of the first embodiment, the description will be omitted.

The specific degree-of-freedom setting unit 150 sets first position and posture parameters and second position and posture parameters. Also according to this embodiment, like the first embodiment, the parameters which are difficult to calculate because of the form of a model are recorded as second position and posture parameters in advance, among six parameters of the position and posture of an object with reference to a basic coordinate system. However, the parameters excluding the parameters recorded as the second position and posture parameters are recorded as the first position and posture parameters, among six parameters of the position and posture with reference to the model coordinate system.

Next, the processing steps will be described. According to this embodiment, the fundamental processing flow is the same as those in FIG. 3, FIG. 5 and FIG. 8. The different processing from the first embodiment includes step S1100 and step S1400. Step S1100 and step S1400 will be described, and the description of the other processing will be omitted.
(Step S1100)

In the same manner as the first embodiment, two axes which are orthogonal to each other about a model center axis are set, and the model coordinate system is converted such that the model center axis and the set two axes may be coordinate axes to a new model coordinate system. After that, among six-dimensional vector s=[tx, ty, tz, θ, ϕ, ψ]T representing the position and posture parameters based on the converted model coordinate system, ϕ which is a rotation component about the model center axis is recorded as the second position and posture parameter and the other parameters are recorded as the first position and posture parameters.

(Step S1400)

On the bases of information on a two-dimensional image, the position and posture of an object is measured. Also according to this embodiment, the position and posture parameters are optimized such that the sum of squares of the distance between the edge detected on the image and a segment of the model projected on the image on the basis of the deducted position and posture may be the lowest. However, among s=[tx, ty, tz, θ, φ, ψ]T which are position and posture parameters, five parameters tx, ty, tz, θ, and ψ are deducted excluding φ deducted in a second position and posture calculating unit. In the conversion from the model coordinate system to the basic coordinate system, which is expressed by Expression 1, the matrix R representing the posture conversion may be exploded into rotations about the axes and may thus be expressed as in Expression 21.

$$Xc=RxRzRy\ Xm+T \quad (21)$$

where Rx, Rz, and Ry are matrices representing an X-axis rotation θ, Y-axis rotation φ, and Z-axis rotation ψ of the model coordinate system.

Here, it is assumed that the amount of small change in position and posture of an object from the schematic position and posture is five-dimensional vector Δs=[Δtx, Δty, Δtz, Δθ, Δψ]T. In the model coordinate system, the coordinate conversion from the object coordinate system Xm to the basic coordinate system Xc when the five parameters tx, ty, tz, θ, and ψ undergo a small change may be expressed as in Expression 22.

$$Xc=RxΔRxRzΔRzRy\ Xm+T+ΔT \quad (22)$$

where the rotation matrix Representing an X-axis small rotation Δθ is ΔRx, the rotation matrix Representing a Z-axis small rotation Δψ is ΔRz, and the amount of small change in position is ΔT=[Δtx, Δty, Δtz]T.

In the same manner as the first embodiment, the amount of small change Δs is acquired on the basis of the conversion expression, and the position and posture components are corrected to calculate the first position and posture.

As described above, according to this embodiment, the first position and posture calculation does not calculate the parameter of the degree of freedom which is deducted by the second position and posture calculation. The reduction of the number of degree-of-freedom components to be deducted in the first position and posture calculation allows more efficient position and posture calculation.

Third Embodiment

According to the first embodiment, the position and posture deduction uses a two-dimensional image. According to this embodiment, the position and posture deduction uses a depth map for a similar object to that of the first embodiment. Because the fundamental configuration according to this embodiment is the same as that of the first embodiment, the description will be omitted. Processing units according to this embodiment will be described below. Because the schematic position and posture input unit 120, three-dimensional form model input unit 130, specific degree-of-freedom setting unit 150, and correspondence acquiring unit 170 are the same as those of the first embodiment, the description will be omitted.

An image capturing unit 110 is a distance sensor which captures a depth map. A depth map is an image of pixels having depth information. The distance sensor may be of an active type which captures the reflected light of laser light or slit light irradiated to a target with a camera and measures the distance by triangulation. However, the distance sensor is not limited thereto, it may be of a Time-of-flight for using the time of flight of light. Alternatively, it may be of a passive type in which a stereo camera calculates the depths of pixels by triangulation from a captured image. Any other types which measure a depth map may not impair the spirit of the present invention.

An image feature detecting unit 140 detects a geometric feature corresponding to an image captured by the image capturing unit 110. According to this embodiment, a three-dimensional point is detected as a geometric feature and is associated with a model vertex. More specifically, on the basis of schematic values of the position and posture of an object input from the schematic position and posture input unit 120, model vertices of a three-dimensional form model are projected on the image. From the distance values corresponding to the pixels projecting the model vertices, the three-dimensional coordinates of the camera coordinate system are calculated. The three-dimensional points for which the three-dimensional coordinates are calculated are image features corresponding to the projected model vertices. The image features are used in the first position and posture calculating unit 160 for calculation of the first position and posture of an object in the first position and posture calculating unit 160.

The first position and posture calculating unit 160 uses the image features detected by the image feature detecting unit 140 to calculate the first position and posture of the measurement target object. According to this embodiment, the distance between a three-dimensional plane of a model and a point acquired from the captured image is minimized to calculate the first position and posture.

On the basis of the first position and posture, the correspondence acquiring unit 170 acquires the correspondence in geometric feature between the three-dimensional form model and the captured image, which supports the calculation of the second position and posture parameters. The acquired correspondence is used in the second position and posture calculating unit 180 for deducting the second position and posture parameters.

On the basis of the first position and posture, the second position and posture calculating unit 180 uses the correspondence acquired by the correspondence acquiring unit 170 to calculate the second position and posture. According to this embodiment, the distance between three-dimensional points on the model and points acquired from the captured image are minimized to calculate the second position and posture.

Next, processing steps will be described. According to this embodiment, the fundamental processing flow is similar to those of FIG. 3, FIG. 5 and FIG. 8. Because step S1100, step S1300, step S1410, step S1440, step S1450, step S1460, step S1610, step S1630, step S1640, and step S1650 are the same as those of the first embodiment, the description will be omitted.

(Step S1200)

The image capturing unit 110 captures the depth map of a measurement target object and input it to the image feature detecting unit 140.

(Step S1400)

On the basis of the information on the depth map, the position and posture of the object are measured. According to this embodiment, the position and posture of a measurement target object are calculated such that the projected image of the three-dimensional form model may fit to the three-dimensional points which are features on the depth map. Because the processing routine of the first position and posture calculation in this step is the same as FIG. 5, the description will be omitted. Here, the position and posture parameters s are optimized such that the sum of squares of distances between three-dimensional points acquired by the conversion from the depth map and the plane of the three-dimensional form model projected on the image on the basis of the deducted position and posture may be the lowest. The position and posture of the object are represented by six-dimensional vector s, as in the first embodiment, in the following description. The processing steps of position and posture calculation will be described in order below. The description of the same processing steps as those of the first embodiment will be omitted.

(Step S1420)

Figure 10:
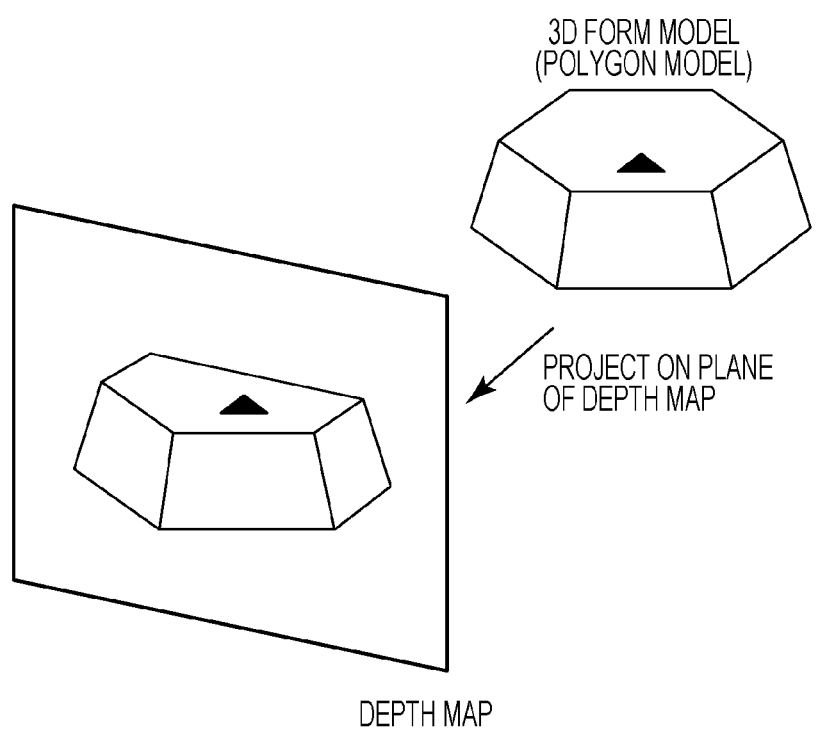
FIG. 10 illustrates the associating processing between a depth map and a model in step S1220.

The depth map input in step S1200 and the model are associated. The associating processing between a depth map and a model will be described below. FIG. 10 illustrates the associating processing between a depth map and a model in this step. This step implements the association by projecting a three-dimensional form model (polygon model) of an object onto a depth map by a publicly known method. The reason why a model is projected onto the depth map is for determining which pixels of the depth map correspond to which polygons of the polygon model. The polygon model is rendered to an image buffer having an equal size to the depth map by using internal parameters of a calibrated camera and schematic values of the position and posture. Hereinafter, the image on which the polygon model is rendered will be called a polygon rendered image. The rendering is performed by assigning a unique color to each of the polygons. The colors of polygons are expressed by RGB colors. For distinction from the background part, colors excluding black (R=0, G=0, B=0) are used to render the polygons. This allows identification of the polygons corresponding to the pixels of the depth map by the colors of the image. The polygon rendering processing may be performed quickly in a GPU (Graphics Processing Unit), and the image resulting from the rendering may be loaded. After the polygon model is rendered, the values of the pixels of the polygon rendered image are read. The pixels saving the values excluding black are associated with the three-dimensional coordinates stored in the corresponding pixels on the depth map and polygons corresponding to the colors on the polygon rendered image.

(Step S1430)

On the basis of the correspondence between the polygons of the three-dimensional form model and three-dimensional points converted from the depth map, the coefficient matrix and error vector for calculating the position and posture are calculated. Hereinafter, a method will be described for calculating a coefficient matrix and an error vector on the basis of the correspondence between pixels (three-dimensional points) and a plane of a depth map.

The equation of a plane in a three-dimensional space is generally expressed by ax+by+cz=e(a 2+b 2+c 2=1). Here, it is assumed that the equation for a plane in a coordinate system of a measurement target object in one face of a three-dimensional form model is ax+by+cz=e. This equation of the plane may be converted to an equation a'x+b'y+c'z=e' of a plane in a basic coordinate system on the basis of the position and posture schematic values. The coordinate conversion based on the position and posture schematic values from a three-dimensional point Xm=[xm, ym, zm]T of a model coordinate system to a three-dimensional point Xc=[xc, yc, zc]T of a basic coordinate system is expressed by Expression 23.

$$Xc = R\,Xm + T \tag{23}$$

where R is a 3×3 rotation matrix Representing a posture, and T is a three-dimensional vector representing a position. In this case, coefficients of the equation for a plane in the basic coordinate system may be expressed by Expression 24.

[Math. 12]

$$\begin{bmatrix} a' \\ b' \\ c' \end{bmatrix} = R \begin{bmatrix} a \\ b \\ c \end{bmatrix},\ e' = e + \begin{bmatrix} a \\ b \\ c \end{bmatrix}^T R^T T \tag{24}$$

It is assumed that a point P where measured values of three-dimensional coordinates in the basic coordinate system are (x', y', z') is associated with a face F in the three-dimensional form model. The foot of a perpendicular from the point P to the face F is Q. The three-dimensional coordinates (x, y, z) of the point Q in the basic coordinate system are converted on the basis of the position and posture s of a measurement target object and may be approximated by a primary Taylor expansion in the vicinity of the three-dimensional coordinate (x0, y0, z0) of one position and posture s, as in Expression 25.

[Math. 13]

$$x \approx x_0 + \sum_{i=1}^{6} \frac{\partial x}{\partial s_i} \Delta s_i$$

$$y \approx y_0 + \sum_{i=1}^{6} \frac{\partial y}{\partial s_i} \Delta s_i \tag{25}$$

$$z \approx z_0 + \sum_{i=1}^{6} \frac{\partial z}{\partial s_i} \Delta s_i$$

Assuming that (x, y, z) converted with a correct s is on the plane(a'x+b'y+c'z=e', e'=a'x'+b'y'+c'z') having a normal vector passing through the same point P as the face F does, the substitution of Expression 21 to a plane equation results in Expression 26.

[Math. 14]

$$a' \sum_{i=1}^{6} \frac{\partial x}{\partial s_i} \Delta s_i + b' \sum_{i=1}^{6} \frac{\partial y}{\partial s_i} \Delta s_i + c' \sum_{i=1}^{6} \frac{\partial z}{\partial s_i} \Delta s_i = e' - q \tag{26}$$

where $q = a'x_0 + b'y_0 + c'z_0$ (constant). The observation equation of Expression 26 may be formed for all mapped points data.

The observation equations of Expression 25 and Expression 26 are equations regarding a small change Δsi (i=1, 2, . . . , and 6) of the components of s, a linear simultaneous equation regarding Δsi expressed by Expression 12 may be formed as in Expression 27.

[Math. 15]

$$\begin{bmatrix} \sin\theta_1 \frac{\partial u}{\partial s_1} - \cos\theta_1 \frac{\partial v}{\partial s_1} & \sin\theta_1 \frac{\partial u}{\partial s_2} - \cos\theta_1 \frac{\partial v}{\partial s_2} & \cdots & \sin\theta_1 \frac{\partial u}{\partial s_6} - \cos\theta_1 \frac{\partial v}{\partial s_6} \\ \sin\theta_2 \frac{\partial u}{\partial s_1} - \cos\theta_1 \frac{\partial v}{\partial s_1} & \sin\theta_2 \frac{\partial u}{\partial s_2} - \cos\theta_2 \frac{\partial v}{\partial s_2} & \cdots & \sin\theta_2 \frac{\partial u}{\partial s_6} - \cos\theta_2 \frac{\partial v}{\partial s_6} \\ \vdots & \vdots & \ddots & \vdots \\ a_1' \frac{\partial x}{\partial s_1} + b_1' \frac{\partial y}{\partial s_1} + c_1' \frac{\partial z}{\partial s_1} & a_1' \frac{\partial x}{\partial s_2} + b_1' \frac{\partial y}{\partial s_2} + c_1' \frac{\partial z}{\partial s_2} & \cdots & a_1' \frac{\partial x}{\partial s_6} + b_1' \frac{\partial y}{\partial s_6} + c_1' \frac{\partial z}{\partial s_6} \\ a_2' \frac{\partial x}{\partial s_1} + b_2' \frac{\partial y}{\partial s_1} + c_2' \frac{\partial z}{\partial s_1} & a_2' \frac{\partial x}{\partial s_2} + b_2' \frac{\partial y}{\partial s_2} + c_2' \frac{\partial z}{\partial s_2} & \cdots & a_2' \frac{\partial x}{\partial s_6} + b_2' \frac{\partial y}{\partial s_6} + c_2' \frac{\partial z}{\partial s_6} \\ \vdots & \vdots & & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ e_1' - q_1 \\ e_2' - q_2 \\ \vdots \end{bmatrix} \quad (27)$$

This linear simultaneous equation may be expressed by Expression 28.

$$J\Delta s = E \quad (28)$$

J of the left-hand side is the coefficient matrix to be acquired, and E of the right-hand side is the error vector.

(Step S1500)

On the basis of the first position and posture, the three-dimensional coordinates (image feature) on the depth map corresponding to a point (model feature) on the three-dimensional form model face is acquired. The model feature is designated and is recorded in advance in the same manner as the first embodiment. Next, the image feature corresponding to the model feature is identified from the captured depth map. More specifically, on the basis of the first position and posture, the three-dimensional form model and the recorded model feature are rendered on the depth map. The image and the captured image are compared to manually designate the pixel corresponding to the model feature on the captured image. The image feature is acquired by converting the distance value of the pixel to a three-dimensional point.

In this case, the method for acquiring the correspondence between a model feature and an image feature is not limited thereto. For example, as in the first embodiment, the depth map pattern of the region corresponding to a model feature may be stored in advance, and pattern matching with a captured image may be performed thereon to acquire the corresponding image feature. By performing this processing, the image feature corresponding to a model feature may be acquired. At least one correspondence between a model feature and an image feature may be required, but the processing may be performed on a plurality of model features to acquire a plurality of correspondences.

(Step S1620)

On the basis of the correspondence between the model feature and the image feature, the coefficient matrix and error vector for calculating the position and posture are calculated. According to this embodiment, the three-dimensional coordinates of the model feature converted to the basic coordinate system are expressed as (xc0, yc0, zc0), by handing the first position and posture as the position and posture schematic values and on the basis of the schematic position and posture. It is assumed that the three-dimensional coordinates of the image feature corresponding to the model feature is (xc, yc, zc). Here, the position of the model point on the image changes in accordance with the small change ϕ of the measurement target object. Thus, the coordinates (xc, yc, zc) projecting the model feature onto a screen may be approximated by a primary Taylor expansion in the vicinity of (xc0, yc0, zc0), as in Expression 29.

[Math. 16]

$$x_c \approx x_{c0} + \frac{\partial x}{\partial \phi} \Delta\phi \quad (29)$$
$$y_c \approx y_{c0} + \frac{\partial y}{\partial \phi} \Delta\phi$$
$$z_c \approx z_{c0} + \frac{\partial z}{\partial \phi} \Delta\phi$$

where $\Delta\phi$ represents a small change of a rotation $\phi$ in the Y-axis direction. The observation equation of Expression 29 may be formed for all mapped points data, as in Expression 30.

[Math. 17]

$$\begin{bmatrix} \frac{\partial x_1}{\partial \phi} \\ \frac{\partial y_1}{\partial \phi} \\ \frac{\partial z_1}{\partial \phi} \\ \vdots \end{bmatrix} \Delta\phi = \begin{bmatrix} x_{c1} - x_{c10} \\ y_{c1} - y_{c10} \\ z_{c1} - z_{c10} \\ \vdots \end{bmatrix} \quad (30)$$

where xi', yi', and zi' refer to three-dimensional coordinates of a model feature, and xi0, yi0, and zi0 refer to three-dimensional coordinates of the image feature corresponding to the model feature (i=1 . . . n, n:the number of features). The linear simultaneous equation is expressed as Expression 31.

$$J2\Delta\phi = E2 \quad (31)$$

J2 of the left-hand side is a coefficient matrix to be acquired, and E2 of the right-hand side is an error vector. Solving the acquired equation in the same manner as in step S1630 of the first embodiment may provide a second position and posture.

As described above, according to this embodiment, a depth map is used for a similar object to that of the first embodiment to deduct its position and posture. First, the correspondence in three-dimensional point between a model and an image is used to deduct the position and posture of the object once. Then, the feature correspondence between the model and the image is used to minimize the three-dimensional distance and thus perform registration limited to the specific axis rotation direction of on the model.

When a two-dimensional image and a depth map may be acquired simultaneously, the method using the two-dimensional image and the method using the three-dimensional image may be switched upon registration before calculation of the first position and posture and registration after calculation of the second position and posture, or they may be used simultaneously.

Fourth Embodiment

According to the first embodiment, the second position and posture calculation includes nonlinear optimization repeating the correction of parameters to calculate the second position and posture. On the other hand, an equation may be formed from the correspondence in geometric feature between a three-dimensional form model and an image feature, which is acquired in step S1610. The equation may be solved to directly calculate the parameters.

According to this embodiment, the second position and posture calculation directly calculates parameters from a feature correspondence to calculate the second position and posture.

Because the configuration of the position and posture measuring apparatus 1 according to this embodiment is the same as that of the first embodiment, the description will be omitted.

Next, processing steps will be described. According to this embodiment, the fundamental processing flow is the same as those in FIG. 3 and FIG. 5. Because the processing in step S1600 is only different from the first embodiment, the descriptions of the other processing steps will be omitted, and step S1600 will be described.

(Step S1600)

The first position and posture calculated in step S1400 is expected to be correct except for the parameter φ regarding the specific degree of freedom. In this step, an equation about the parameter φ regarding a specific degree of freedom is formed by using the first position and posture as a schematic position and posture and is solved to calculate the second position and posture.

As described in the first embodiment, the coordinate conversion from a three-dimensional point Xm=[xm, ym, zm]T of the object coordinate system to the three-dimensional point Xc=[xc, yc, zc]T of the basic coordinate system when the first position and posture is rotated by φ in the Y-axis direction of the model coordinate system as a schematic position and posture may be expressed by Expression 32.

[Math. 18]

$$\begin{bmatrix} x_c \\ y_c \\ z_c \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} c & 0 & s \\ 0 & 1 & 0 \\ -s & 0 & c \end{bmatrix} \begin{bmatrix} x_m \\ y_m \\ z_m \end{bmatrix} + \begin{bmatrix} T_x \\ T_y \\ T_z \end{bmatrix} \quad (32)$$

$$\begin{bmatrix} x_c \\ y_c \\ z_c \end{bmatrix} = \begin{bmatrix} (cr_{11} - sr_{13})x_m + r_{12}y_m + (sr_{11} + cr_{13})z_m + T_x \\ (cr_{21} - sr_{23})x_m + r_{22}y_m + (sr_{21} + cr_{23})z_m + T_x \\ (cr_{31} - sr_{33})x_m + r_{32}y_m + (sr_{31} + cr_{33})z_m + T_x \end{bmatrix}$$

where c=cos φ, and s=sin φ. In this case, normalized image coordinates u and v when the model feature rotated by φ from the schematic position and posture is projected on a screen may be calculated as u=xc/zc and v=yc/zc. Forming an equation representing that u and v are equal to the corresponding image features u0 and v0, Expression 33 may be formed regarding two variables of c=cos φ and s=sin φ.

[Math. 19]

$$A \begin{bmatrix} c \\ s \end{bmatrix} = B \quad (33)$$

In this case, A is a 2×2 matrix, b is a two-dimensional vector. tan φ is calculated from sin φ and cos φ calculated by solving the equation, and φ is acquired from tan φ.

As described above, this embodiment is a method which directly calculates parameter from a feature correspondence to calculate the second position and posture in the second position and posture calculation. Because this method may not require repeated processing in the second position and posture calculation, the position and posture may be calculated quickly.

Fifth Embodiment

According to the first embodiment, the position and posture of an object having a substantially rotation symmetrical form about a specific axis are deducted. According to this embodiment, the position and posture of an object having fewer features for determining the translation direction of a specific axis of a model coordinate system are deducted. Calculating the position and posture of such an object by fairly handling six degree-of-freedom components of the position and posture may not provide correct parameters of the translation direction of a specific axis of a model. Accordingly, after the position and posture are calculated, the translation parameter of a specific axial direction of the model is only deducted in a later stage. According to this embodiment, the position and posture of an object is first calculated through registration of edges, and the translation parameter of a specific axis of a model is then deducted to measure the position and posture.

Because the configuration of the position and posture measuring apparatus 1 according to this embodiment is the same as that of the first embodiment, the description will be omitted.

Next, processing steps will be described below. According to this embodiment, a fundamental processing flow is the same as those in FIG. 3, FIG. 5 and FIG. 8. The different processing from the first embodiment includes step S1100, step S1600 and step S1620. Thus, the description of the other processing steps will be omitted, and step S1100, step S1600, and step S1620 will be described.

(Step S1100)

Figure 11A:
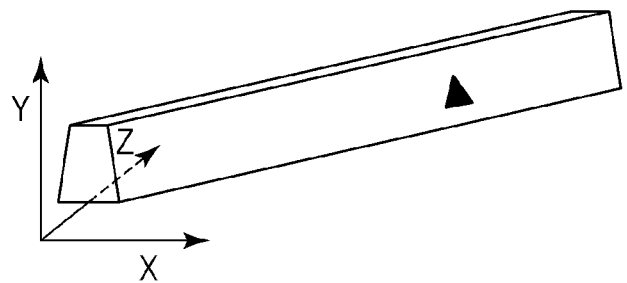
FIGS. 11A to 11C illustrate setting of first position and posture parameters and second position and posture parameters according to a second embodiment.
Figure 11B:
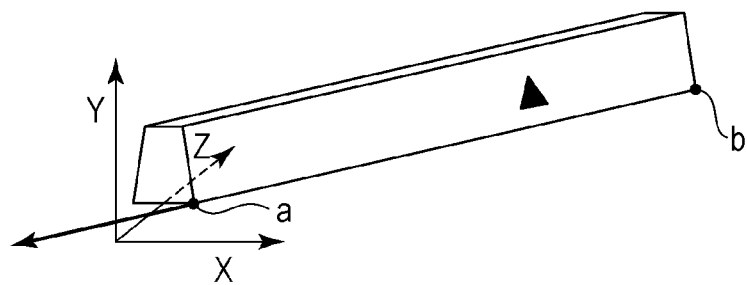

First position and posture parameters and second position and posture parameters are set. FIG. 11A illustrates a concrete example of a target model of this embodiment and its coordinate system. According to this embodiment, as illustrated in FIG. 11A, it is assumed that the model has a form having a fewer features for determining a translation direction about one axial direction. For this model, the axis (hereinafter, called a model center axis) which defines the translation direction of the model is determined. The model center axis may be set on the basis of input from a user. More specifically, for a model having a square pillared shape as in FIG. 11A, two points a and b on an edge segment of the model connecting opposite two faces of the square pole are recorded as a model center axis (FIG. 11B). However, the method for setting the model center axis is not limited thereto. For example, the main axis position and direction are acquired from vertices on the model faces, and the vector represented by them may be used as the model center axis.

Any other methods may be used if the rotation center axis which defines the rotation symmetry of a model form may be calculated.

Figure 11C:
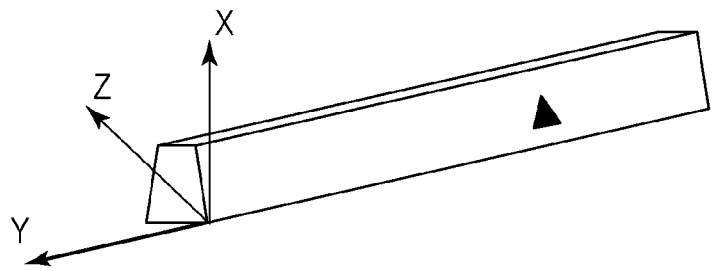

Next, the model center axis and two axes orthogonal to each other are set. In this case, the model coordinate system is converted and re-defined such that the model center axis and the set two axes may be its coordinate axes (FIG. 11C). In the converted model coordinate system, the Y-axis (solid line) is matched with the model center axis. However, the method for converting the model coordinate system is not limited thereto. For example, the model coordinate system may be converted such that its X-axis may be matched with the model center axis. Alternatively, the model coordinate system may be converted in any other manner if the direction of the model center axis is identical to the direction of a similar form of the model. The subsequent processing is assumed to use the converted model coordinate system. On the basis of the converted model coordinate system, like the first embodiment, the position and posture of the position and posture measuring apparatus 1 are represented by six-dimensional vector s=[tx, ty, tz, θ, φ, ψ]T. The six parameters are recorded as first position and posture parameters. The translation component about the coordinate axis corresponding to the model center axis is recorded as second position and posture parameters. According to this embodiment, because the Y-axis is matched with the model center axis, ty which is the translation component in the Y-axis direction is recorded as second position and posture parameters.

(Step S1600)

The first position and posture calculated by step S1400 is expected to be correct except for the parameter ty regarding the specific degree of freedom. In this step, an equation about the parameter ty regarding a specific degree of freedom is formed by using the first position and posture as a schematic position and posture and is solved to calculate the second position and posture.

When the first position and posture are a schematic position and posture, the relationship of Expression 5 is satisfied as in step S1400. Here, the three-dimensional vector representing Δty about the Y-axis direction with reference to the model coordinate system is ΔT=[0, ty, 0]T. In this case, the coordinate conversion from a three-dimensional point Xm=[xm, ym, zm]T of the object coordinate system to the three-dimensional point Xc=[xc, yc, zc]T of the basic coordinate system when the first position and posture undergoes small translation in the Y-axis direction of the model coordinate system may be expressed by Expression 34.

$$Xc=R(Xm+\Delta T)+T \quad (34)$$

Accordingly, this step acquires the amount of small change Δty and corrects the translational motion parameter in the Y-axis direction of the model coordinate system to calculate the position and posture.

Here, like the first embodiment, the position and posture are optimized such that the sum of squares of the distance between the coordinates of a feature detected on an image and coordinates of a model feature projected on the image on the basis of the first position and posture may be the lowest.

(Step S1620)

On the basis of the correspondence between the model feature and the image feature, a coefficient matrix and an error vector for calculating a position and a posture are calculated. Also according to this embodiment, the same relationship is satisfied with ty replacing θ of Expression 14. Here, Expression 34 is expressed as follows.

[Math. 20]

$$\begin{bmatrix} x_c \\ y_c \\ z_c \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} x_m \\ y_m + t_y \\ z_m \end{bmatrix} + \begin{bmatrix} T_x \\ T_y \\ T_z \end{bmatrix} \quad (21)$$

[Math. 21]

$$\begin{bmatrix} x_c \\ y_c \\ z_c \end{bmatrix} = \begin{bmatrix} r_{11}x_m + r_{12}(y_m + t_y) + r_{13}z_m + T_x \\ r_{21}x_m + r_{22}(y_m + t_y) + r_{23}z_m + T_y \\ r_{31}x_m + r_{32}(y_m + t_y) + r_{33}z_m + T_z \end{bmatrix} \quad (22)$$

The image coordinates u and v may be expressed as u=xc/zc and v=yc/zc, respectively. Thus, they are partially differentiated by ty to form a linear simultaneous equation which is similar to Expression 14, with ty replacing φ. The second position and posture may be calculated by solving the equation in the same manner as the first embodiment and updating the parameters.

According to the aforementioned embodiment, the position and posture of an object having a similar form to the translation direction of a specific axis of a model coordinate system are deducted. The position and posture of an object are calculated once, and the translation parameters of a specific axis of the model are then deducted so that the correct parameters of the translation direction of the specific axis may be used for position and posture measurement. Like Variation Example 1-1, the first position and posture calculation may only deduct five parameters excluding ty.

Sixth Embodiment

According to the aforementioned embodiments, position and posture deduction methods for an object having a form that is difficult to deduct parameters of a specific one degree of freedom in a model coordinate system have been described. According to this embodiment, a position and posture deduction method for an object having a form that is difficult to deduct parameters regarding two degrees of freedom of rotation and translation about a specific axis with reference to a model coordinate system will be described.

Because the configuration of the position and posture measuring apparatus 1 according to this embodiment is the same as that of the first embodiment, the description will be omitted.

Next, processing steps will be described. According to this embodiment, the fundamental processing flow is the same as those in FIG. 3, FIG. 5 and FIG. 8. The different processing from the first embodiment includes step S1100, step S1600 and step S1620. Thus, the description of the other processing will be omitted, and step S1100, step S1600, and step S1620 will be described.

(Step S1100)

Figure 12:
FIG. 12 illustrates setting of first position and posture parameters and second position and posture parameters in variation example 2-1.

First position and posture parameters and second position and posture parameters are set. According to this embodiment, as illustrated in FIG. 12, it is assumed that a model has a form that is substantially rotation symmetrical in a specific axial direction and has fewer features for determining a translation direction component of the specific axis.

A model center axis is set to the model. The model center axis may be set by input from a user, for example. Four points a, b, c, and d on a contour line of a model face (circle in FIG. 12) that is perpendicular to the axis that defines the rotation symmetry are acquired as input from a user. In this case, a vector passing through the intersection of the perpendicular bisector of the segment ab and the perpendicular bisector of the segment cd and having the direction perpendicular to the square abcd is calculated as the model center axis (FIG. 4B). However, the setting method for the model center axis is not limited thereto. For example, like the first embodiment, a rotation symmetrical plane may be acquired as input from a user, and the straight line passing through the center of the plane and being orthogonal to the model face may be the model center axis. Any of other methods may be used if it may calculate the rotation center axis that defines the rotation symmetry of a model form.

The model coordinate system is converted and re-defined such that the model center axis and two axes that are orthogonal to each other about the model center axis may be coordinate axes. FIG. 12 illustrates the model converted by the processing. In the converted model coordinate system, the Y-axis (solid line) is matched with the model center axis. Here, with reference to the converted model coordinate system, like the first embodiment, the position and posture of the position and posture measuring apparatus 1 are represented by six-dimensional vector $s=[tx, ty, tz, \theta, \phi, \psi]T$. The six parameters are recorded as first position and posture parameters. The rotation component and translation component about the coordinate axis corresponding to the model center axis are recorded as second position and posture parameters. According to this embodiment, because the Y-axis is matched with the model center axis, $\phi$ that is the Y-axis direction rotation component and ty that is Y-axis direction translation component are recorded as the second position and posture parameters.
(Step S1600)

The first position and posture calculated in step S1400 is expected to be correct except for the parameter $\phi$ and ty regarding a specific degree of freedom. In this step, the parameters $\phi$ and ty regarding a specific degree of freedom are optimized by using the first position and posture as a schematic position and posture, and the position and posture are then calculated.

When the first position and posture are a schematic position and posture, the relationship of Expression 5 is satisfied, as in step S1400.

Here, a 3×3 matrix Representing a small rotation of $\Delta\phi$ in the Y-axis direction with reference to the model coordinate system is $\Delta Ry$, and a three-dimensional vector representing a small translation of $\Delta ty$ in the Y-axis direction is $\Delta T=[0, ty, 0]T$. In this case, the coordinate conversion from a three-dimensional point $Xm=[xm, ym, zm]T$ of the object coordinate system to the three-dimensional point $Xc=[xc, yc, zc]T$ of the basic coordinate system when the first position and posture undergoes small rotation by $\Delta\phi$ in the Y-axis direction of the model coordinate system may be expressed by Expression 37.

$$Xc=R(\Delta RyXm+\Delta T)+T \qquad (37)$$

The amounts of small changes $\Delta\phi$ and $\Delta ty$ are acquired, and the rotation and translation parameters in the Y-axis direction of the model coordinate system are corrected to calculate the position and posture.
(Step S1620)

On the basis of the conversion in Expression 37, the coefficient matrix of the linear simultaneous equation is calculated in the same manner as the first embodiment. This equation is solved in the same manner as the first embodiment, and the parameters are updated to calculate the second position and posture.

According to this embodiment, a position and posture deduction method for an object having a form that is difficult to deduct parameters regarding two degrees of freedom of rotation and translation about a specific axis with reference to a model coordinate system has been described above. Like the second embodiment, the first position and posture calculation may include deduction of four parameters only excluding $\phi$ and ty.

Seventh Embodiment

According to the sixth embodiment, a position and posture deduction method for an object having a form that is difficult to deduct parameters regarding two degrees of freedom of rotation and translation about a specific axis with reference to a model coordinate system has been described.

According to this embodiment, a position and posture deduction method for an object having a sphere or regular polyhedron-like form and having fewer features contributing to the parameters of three degrees of freedom of rotation in a model coordinate system will be described.

Because the configuration of the position and posture measuring apparatus 1 according to this embodiment is the same as that of the first embodiment, the description will be omitted.

Next, processing steps will be described. According to this embodiment, the fundamental processing flow is the same as those in FIG. 3, FIG. 5 and FIG. 8. The different processing from the first embodiment includes step S1100, step S1500, step S1600 and step S1620. Thus, the description of the other processing will be omitted, and step S1100, step S1500, step S1600, and step S1620 will be described.
(Step S1100)

First position and posture parameters and second position and posture parameters are set. According to this embodiment, it is assumed that an object has symmetry for the rotation of three degrees of freedom, like a sphere. For this model, the model coordinate system is converted and is re-defined such that the origin that defines the rotation of three degrees of freedom may be the origin of the model coordinate system.

The setting of the origin that defines rotation of the model may use the center coordinate of the Bounding Box containing the model, for example. Three axis passing through the origin and being orthogonal to each other are set, and the three axes are converted to be a model coordinate system.

Here, with reference to the converted model coordinate system, like the first embodiment, the position and posture of the position and posture measuring apparatus 1 are represented by six-dimensional vector $s=[tx, ty, tz, \theta, \phi, \psi]T$. The six parameters are recorded as first position and posture parameters. The X-axis rotation $\theta$, Y-axis rotation $\phi$, and Z-axis rotation $\psi$ of the model are recorded as the second position and posture parameter.
(Step S1500)

On the basis of the first position and posture, coordinates (image feature) on a two-dimensional image corresponding to a point (model feature) on the three-dimensional form model face. Also according to this embodiment, the correspondence between the model and the image is acquired in the same manner as the first embodiment. According to this embodiment, the second position and posture calculation includes deduction of three parameters. Because two equations may be acquired for one correspondence on the two-dimensional image, at least two correspondences are acquired.
(Step S1600)

The first position and posture calculated in step S1400 is expected to be correct except for the parameters $\theta$, $\phi$, and $\psi$ and ty regarding a specific degree of freedom. In this step, the second position and posture parameters θ, φ, and ψ are optimized by using the first position and posture as a schematic position and posture, and the position and posture are then calculated.

When the first position and posture are a schematic position and posture, the relationship of Expression 5 is satisfied, as in step S1400.

Here, a 3×3 matrix Representing a small rotation of Δθ in the X-axis direction is ΔRx, 3×3 matrix Representing a small rotation of Δφ in the Y-axis direction is ΔRy, a 3×3 matrix representing a small rotation of Δφ in the Z-axis direction is ΔRz, with reference to the model coordinate system. In this case, the coordinate conversion from a three-dimensional point Xm=[xm, ym, zm]T of the object coordinate system to the three-dimensional point Xc=[xc, yc, zc]T of the basic coordinate system when the first position and posture undergoes small rotation by Δφ in the Y-axis direction of the model coordinate system may be expressed by Expression 38.

$$Xc = Rx\Delta Rx\ Ry\Delta Ry\ Rz\Delta Rz Xm + T \qquad (38)$$

Here, Rx, Ry, and Rz are acquired as a result of resolution of the matrix R of Expression 31 into rotations about the axes, and the relationship R=RxRyRz is satisfied.

In this step, the amounts of small changes Δθ, Δφ, and Δψ are acquired, and the rotation parameters of the model coordinate system are corrected to calculate the position and posture.

(Step S1620)

On the basis of the conversion in Expression 38, the coefficient matrix of the linear simultaneous equation is calculated in the same manner as the first embodiment. This equation is solved in the same manner as the first embodiment, and the parameters are updated to calculate the second position and posture.

According to this embodiment, a position and posture deduction method for an object having a sphere or regular polyhedron-like form and having fewer features contributing to the parameters of three degrees of freedom of rotation in a model coordinate system has been described above. Like the second embodiment, the first position and posture calculation may include deduction of three parameters only excluding θ, φ, and ψ.

When one feature exists on a sphere-plane, the rotation parameter about the axis connecting the feature and the center of the sphere is variable. For such a form, two rotation parameters may be used to perform the deduction in the same manner as this embodiment.

Eighth Embodiment

According to the first embodiment and sixth embodiment, step S1100 determines the model center axis on the basis of input from a user. According to this embodiment, a method for automatically determining the model center axis from three-dimensional design CAD data of an object. In general, when the form of an entire model is substantially rotation symmetrical, the rotation symmetrical axis of a rotation symmetrical analysis curved planes is often matched with the rotation symmetrical axis. Accordingly, the rotation center axis of a rotation symmetrical plane form is extracted from analysis curved planes contained in three-dimensional design CAD data of an object. For many rotation symmetrical planes, rotation symmetrical axes having the same position and direction are set as model center axes.

Figure 13:
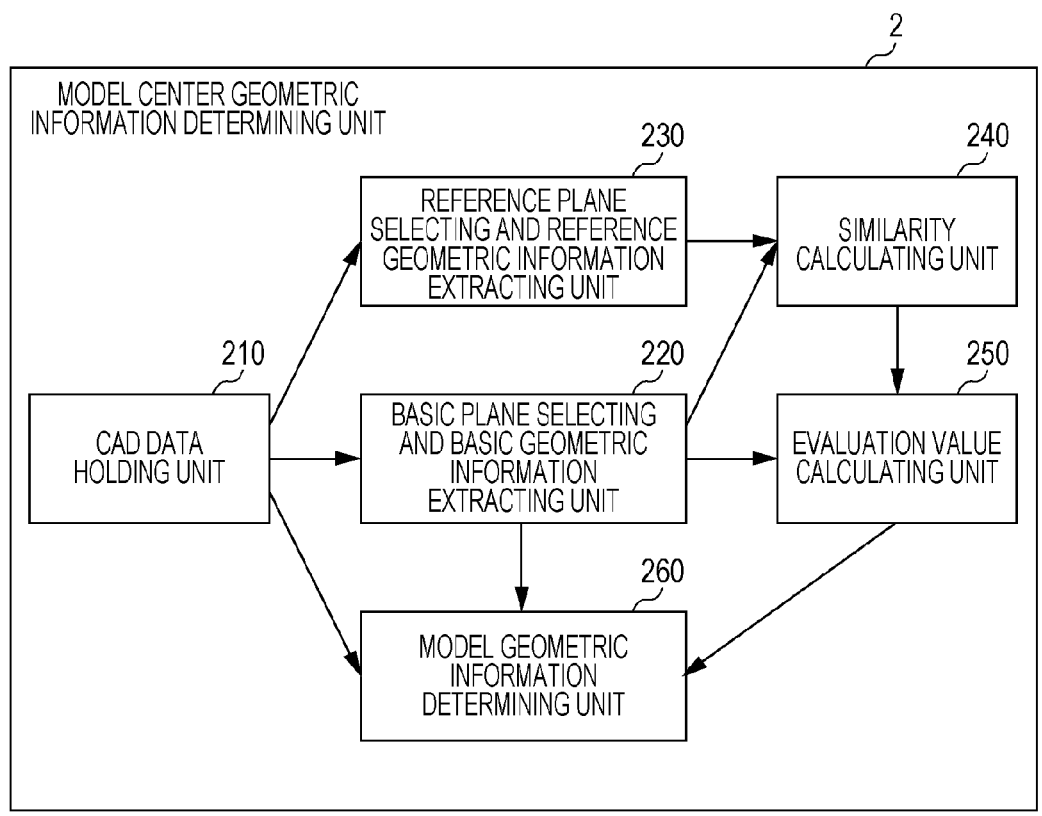
FIG. 13 illustrates a configuration of a model center axis determining unit 2 according to the eighth embodiment.

FIG. 13 illustrates a configuration of a model center axis determining unit 2 according to this embodiment. As illustrated in FIG. 13, a model central axis determining unit 2 includes a three-dimensional CAD data storing unit 210, a basic face selecting and basic geometric information extracting unit 220, a reference plane selecting and reference geometric information extracting unit 230, a similarity calculating unit 240, an evaluation value calculating unit 250, and a model geometric information determining unit 260. The model center axis determining unit 2 input the model center axis to the specific degree-of-freedom setting unit 150 in FIG. 1. The components of the model center axis determining unit 2 will be described below.

The three-dimensional CAD data storing unit 210 stores three-dimensional CAD data on a measurement target object. The three-dimensional CAD data may be data for designing a target object, for example. Here, the three-dimensional CAD data contain a set of trimmed curved planes formed by cutting out at contour lines analysis curved planes having any one attribute of plane, B-Spline-curved plane, torus curved plane, cylinder, cone, circle and so on. Each of the analysis curved planes stores an analysis parameter representing its plane form. It is assumed that the three-dimensional CAD data is identical to the coordinate system of a three-dimensional form model to be used for registration. However, they may not be identical if the relative position relationship is available between a coordinate system of the three-dimensional CAD data and the coordinate system of a three-dimensional form model to be used for registration. One generated by reverse-engineering may be used if it is three-dimensional CAD data representing the form with a set of analysis curved planes.

The basic face selecting and basic geometric information extracting unit 220 selects one analysis curved plane on which the comparison of similarity of the Z rotation symmetrical axis is based from a plurality of analysis curved planes contained in the three-dimensional CAD data. A rotation symmetrical plane is only selected, and the other planes are not selected. The extracted analysis curved plane will be called a basic face. The basic face selecting and basic geometric information extracting unit 220 further extracts an axis unique to the plane from a analysis curved plane parameter of the basic face. Each of the analysis curved planes stores the position and direction in the model coordinate system of two axes that define UV coordinate system as parameters in order to represent the plane with a UV parameter space. The two axes correspond to the rotation center axis and the axis that is orthogonal to the rotation center axis if the analysis curved plane is rotation symmetrical or two axes that are orthogonal to each other and are in parallel with the plane, if the analysis curved plane is planer. From the two axes, one representing the rotation center axis is extracted. The extracted axis will be called a basic axis, hereinafter. The reference plane selecting and reference geometric information extracting unit 230 selects one analysis curved plane which is different from the analysis curved plane extracted by the basic face selecting and basic geometric information extracting unit from the plurality of analysis curved planes contained in the three-dimensional CAD data and extracts an axis unique to the selected analysis curved plane. The plane and axis extracted here will be called a reference plane and reference axis, hereinafter.

The similarity calculating unit 240 calculates the similarity between the basic axis and the reference axis on the basis of the parameters of the basic axis and reference axis.

On the basis of the similarity of the reference axes to the basic axis, the evaluation value calculating unit 250 calculates evaluation values that evaluate the number of rotation symmetrical axes with high similarity to the basic axis.

On the basis of the evaluation values calculated to the basic axis, the model geometric information determining unit 260 determines the model center axis.

Figure 14:
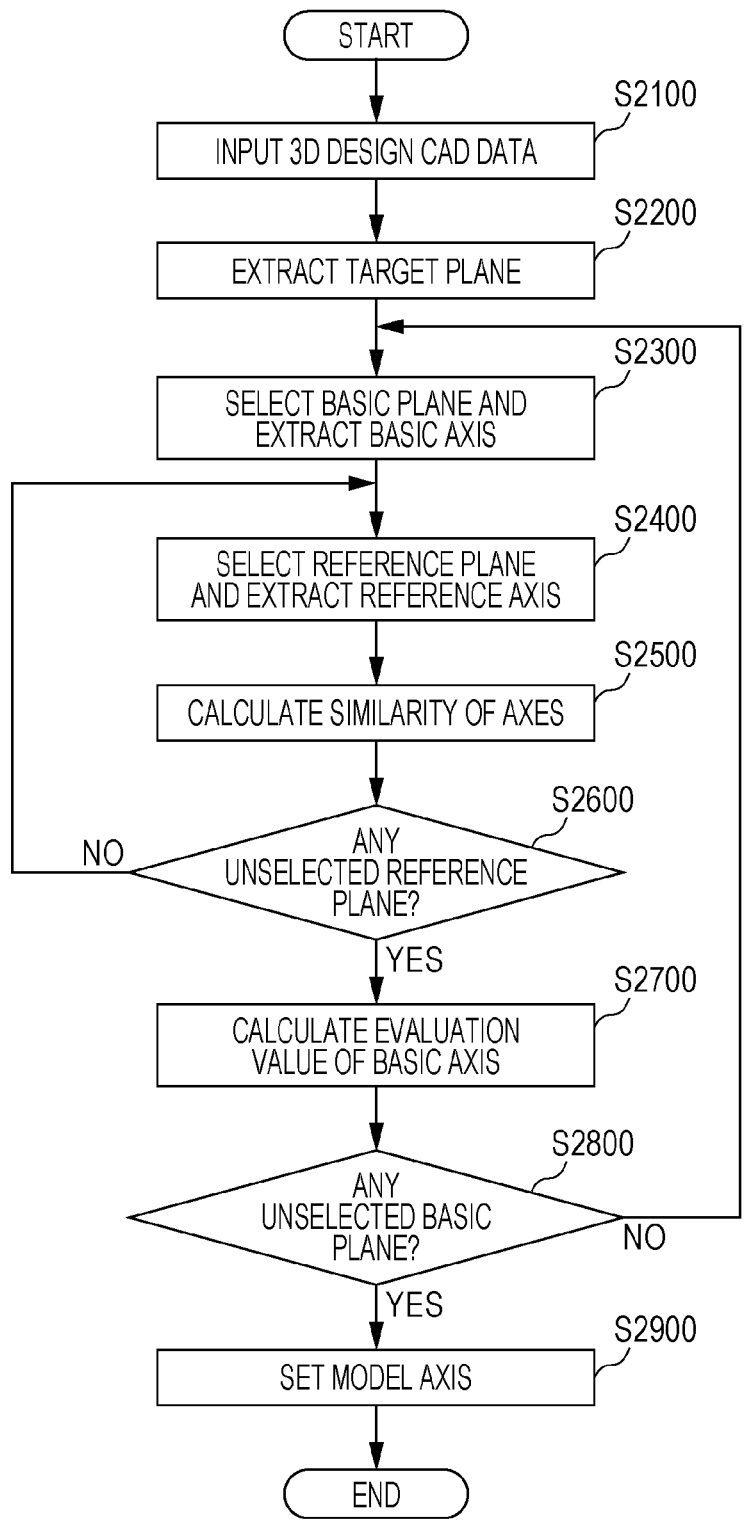
FIG. 14 is a flowchart illustrating processing for the model axis determination according to the eighth embodiment.

FIG. 14 is a flowchart illustrating processing for the model axis determination according to the eighth embodiment.

(Step S2100)

Three-dimensional CAD data of a target object is input from the three-dimensional CAD data storing unit 210.

(Step S2200)

An analysis curved plane to be used for model axis determination is extracted from a plurality of analysis curved planes contained in the three-dimensional CAD data. According to this embodiment, an analysis curved plane having an attribute of circle, cylinder, and cone is extracted. Any analysis curved plane may be extracted if it has a rotation symmetrical form. Here, it is assumed that the number of extracted analysis curved planes is M.

(Step S2300)

The basic face selecting and basic geometric information extracting unit 220 selects a basic face from the M analysis curved planes extracted in step S2200 and extracts a basic axis. First, one analysis curved plane to be the basic face is selected at random from the M analysis curved planes. It is assumed that the selected analysis curved plane is a basic faces $F_i$ (i=1 to M). Next, the rotation center axis of the plane is extracted as a basic axis $A_i$ from analysis curved plane parameters representing the basic face $F_i$. Here, $A_i$ is represented by a three-dimensional coordinate $p_i$ representing a beginning position in the model coordinate system and a three-dimensional vector $n_i$ representing its direction.

(Step S2400)

The reference plane selecting and reference geometric information extracting unit 230 extracts a reference face and a reference axis from the M analysis curved planes extracted in step S2200. First, among M analysis curved planes, one analysis curved plane to be referred that is different from the basic face is selected. The selected analysis curved plane is handled as a reference face $F_j$ (j=1 to M where j≠i). Like step S2300, a rotation center axis is extracted as $A_j$ from analysis curved plane parameters expressing the reference face $F_j$. In this case, the three-dimensional coordinates representing the beginning position of the reference axis is $p_j$, and the three-dimensional vector representing the direction is $n_j$.

(Step S2500)

The similarity calculating unit 240 calculates the similarity of the reference axis $A_j$ to the basic axis $A_i$ from the parameters of the basic axis $A_i$ and reference axis $A_j$. More specifically, the distance similarity and direction similarity between two axes are calculated. First, when the distance between the beginning points of the basic axis and reference axis is d1 and the distance between the beginning point of the reference axis projected to the basic axis and the beginning point of the basic axis is d2, the distance similarity $\alpha_{ij}$ is defined and calculated as in Expression 39:

[Math. 22]

$$\alpha_{ij}=1/\|d1-d2\| \quad (39)$$

where $d1=\|p_j-p_i\|$, $d2=\|(p_j-p_i)\cdot n_i\|$

Next, the similarity $\beta_{ij}$ in direction between the basic axis and the reference axis is defined and calculated as in Expression 40.

[Math. 23]

$$\beta_{ij}=\|n_j\cdot n_i\| \quad (40)$$

As the values of the similarity $\alpha_{ij}$ and similarity $\beta_{ij}$ increase, it means that the similarity of two axes increases. Here, the calculated d1, $\alpha_{ij}$ and $\beta_{ij}$ are recorded along with i and j, respectively.

(Step S2600)

If any of M analysis curved planes extracted in step S2200 is not selected as a reference face excluding the basic face, the processing returns to step S2400. If not, the processing moves to step S2600.

(Step S2700)

The evaluation value calculating unit 250 calculates the sum of the areas of the reference faces having reference axes with similarities which are equal to or higher than a threshold value as evaluation values on the basis of the similarities between the basic axis and the reference axes. First, on the basis of the similarities $\alpha_{ij}$ and $\beta_{ij}$ between the basic axis $A_i$ and the reference axes $A_j$, j which satisfies both of the following conditions in Expression 41 is recorded as the ID of the face having an similar axis.

$$\theta<\alpha_{ij} \text{ and } \phi<\beta_{ij} \quad (41)$$

In this case, $\theta$ and $\phi$ are both threshold values. $\theta$ may be set as $\theta=d1\times10$, and $\phi$ may be set as $\phi=0.9$, for example. Next, on the basis of the recorded ID, the surface areas $S_j$ of the reference faces $F_j$ are acquired, and the total sum is calculated as the evaluation value $V_i$ of the basic axis $A_i$. However, the evaluation value calculating method is not limited thereto. For example, the ID of one that satisfies one of the conditions $\alpha_{ij}$ and $\beta_{ij}$ may be regarded as a similar axis. Alternatively, the evaluation value $V_i=\Sigma(S_j\times\beta_{ij})$ may be used without using any threshold value. Alternatively, the total number of the faces having similarities that are equal to or higher than a threshold value may be used as the evaluation value. The other criteria may be used if the similarity between two axes may be evaluated.

(Step S2800)

If any of M analysis curved planes extracted in step S2200 is not selected as the basic face, the processing returns to step S2300. If not, the processing moves to step S2900. As a result, the evaluation value $V_i$ for the axes of the basic face $F_i$.

(Step S2900)

The model geometric information determining unit 260 determines the basic axis $A_i$ having the highest evaluation value as a model center axis among the evaluation values $V_i$. Alternatively, the several basic axes of the basic axes having higher evaluation values may be extracted as candidates, and the forms of their three-dimensional CAD data and the basic axes are displayed one over another on the screen, and a user may be prompted to select by GUI. More specifically, the proportion of the surface area S of the whole model to the evaluation value $V_i$ may be preset as a threshold value (threshold) (for example, threshold=0.1), and one that satisfies the following relationship in Expression 42 may be extracted and presented.

$$V_i/S>\text{threshold} \quad (42)$$

In this case, basic axes may be extracted in order from the one having the highest evaluation value, and a sequential, a reference axis having a similarity to the extracted basic axis that is equal to or higher than the threshold value may be sequentially excluded from the next extraction candidates, preventing the presentation of a plurality of similar axes only as candidates.

According to this embodiment, the method has been described above which extracts rotation symmetrical axes having rotation symmetrical plane forms from the analysis curved planes contained in three-dimensional design CAD data of an object and sets a rotation symmetrical axis having a position and direction matched with those of many rotation symmetrical planes as a model center axis.

The six degree-of-freedom spaces represented by three parameters of the beginning position and three parameters of direction representing a rotation symmetrical axis may be divided into blocks having a some size, and bins may be preset. Then, voting may be performed on the bins on the basis of the six parameters of the rotation symmetrical axes of the analysis curved planes to select a similar one. In this case, the model center axis is determined by acquiring the average value of all rotation symmetrical axes voted for the bin having the highest number of votes. Any other methods may be used if many rotation symmetrical axes of rotation symmetrical analysis curved planes which have similar directions and positions may be determined.

According to this embodiment, rotation symmetrical planes are extracted from analysis curved planes of CAD data. However, a rotation symmetrical primitive such as an equilateral polygon and a regular polygonal prism may be extracted to implement a similar method, instead of analysis curved planes.

Ninth Embodiment

Automatic Extraction of Axis that Defines Single-Axis Translation from CAD Data

According to the fifth embodiment, in step S1100, a model center axis that defines a specific single-axis translation component is determined on the basis of input from a user or the main axial direction of the entire form of a model. According to this embodiment, like the eighth embodiment, a method will be described which sets a model center axis that defines a specific translation component of a model from three-dimensional design CAD data of a target object. An object for which a translation parameter regarding a specific single-axial direction is difficult to deduct is expected to have a relatively long and narrow plane which is dominantly distributed over the entire form of the model among analysis curved planes forming a model. Accordingly, a plane is extracted from analysis curved planes forming three-dimensional design CAD data the object, the vector going from the barycenter of the plane as the beginning point to the longitudinal direction of the plane is extracted as an axis to be a model center axis candidate. An axis having the position and direction matched with the axis is set as a model center axis.

Because the configuration of model geometric information determining unit 2 according to this embodiment is the same as that of the eighth embodiment, the description will be omitted. However, according to this embodiment, the basic face selecting and basic geometric information extracting unit 220 and reference plane selecting and reference geometric information extracting unit 230 only extract a plane as an analysis curved plane to be used for determining the model center axis from a plurality of analysis curved planes contained in three-dimensional CAD data. The other analysis curved planes than flat planes are not selected. As an axis unique to a plane, a vector going from the barycenter of the plane as the beginning point to the longitudinal direction of the plane is extracted.

Next, processing steps will be described. According to this embodiment, a fundamental processing flow is the same as FIG. 14. The processing that is different from the eighth embodiment includes step S2200, step S2300, and step S2400. Therefore, the description of the other processing will be omitted, and step S2200, step S2300, and step S2400 will be described.

(Step S2200)

An analysis curved plane to be used for model axis determination is extracted from a plurality of analysis curved planes contained in the three-dimensional CAD data. According to this embodiment, an analysis curved plane having an attribute of flat is extracted. Any analysis curved plane may be extracted if it is not curved but flat. Here, it is assumed that the number of extracted analysis curved planes is M.

(Step S2300)

A basic face from the extracted M analysis curved planes is selected, and a basic axis is extracted. First, one analysis curved plane to be the basic face is selected at random from the M analysis curved planes. It is assumed that the selected analysis curved plane is a basic faces $F_i$ (i=1 to M). Next, among analysis curved plane parameters representing a reference face $F_i$, the barycenter of the plane and the vector that is orthogonal to the plane are acquired. Here, the three-dimensional coordinates of the barycenter position is $p_i$, and the three-dimensional vector going from the barycenter position as the beginning point to the longitudinal direction of the plane is $n_i$. However, the extracting method for the axis is not limited thereto.

(Step S2400)

The reference plane selecting and reference geometric information extracting unit 230 extracts a reference face and a reference axis from the M analysis curved planes extracted in step S2200. First, among M analysis curved planes, one analysis curved plane to be referred that is different from the basic face is selected. The selected analysis curved plane is handled as a reference face $F_j$ (j=1 to M where j≠i). Like step S2300, three-dimensional coordinates p representing the beginning position of a reference axis and the three-dimensional vector $n_j$ representing the direction are extracted from analysis curved plane parameters expressing the reference face F.

According to this embodiment, regarding a plane, a vector going from the barycenter of the plane as the beginning point to the longitudinal direction of the plane is extracted as an axis from the analysis curved planes contained in three-dimensional design CAD data, and an axis that is the most similar to the direction and position of the axis is set as the model center axis.

In step S2300, $n_i$ may be a vector going from the barycenter position of the plane as its beginning point and being orthogonal to the plane, instead of a vector going from the barycenter position of the plane to the longitudinal direction. In this case, in step S2400, by using the same axis extracting method as step S2300, the three-dimensional coordinates $p_j$ representing the barycenter position of the plane and a three-dimensional vector $n_j$ going from the barycenter position as its beginning point and being orthogonal to the plane are extracted. In step S2900, from the evaluation values $V_j$, a vector going from the barycenter of the reference face $F_j$ of the basic axis $A_i$ having the highest evaluation value as its beginning point to the longitudinal direction of the plane is determined as the model center axis. Like the seventh embodiment, the same method may be used for determining the center point that defines the three degree of freedom of rotation of an object having a sphere form. In this case, a plurality of analysis curved planes having sphere forms are extracted from analysis curved planes contained in CAD data, and a point having many similar distances to the center points of the planes is determined as the model center point.

Alternatively, a plurality of regular polyhedron forms may be extracted from the CAD data to acquire the center point so that a point that is similar to many center points may be determined as the model center point.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiments.

For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-293019, filed Dec. 28, 2010, which is hereby incorporated by reference herein in its entirety.

The invention claimed is:

1. An information processing apparatus comprising:
an image acquiring unit configured to acquire an image of a measurement target object;
a first position and orientation acquiring unit configured to associate a first geometric feature of a three-dimensional model with a first image feature corresponding to the first geometric feature within the image based on an approximate position and orientation of the measurement target object and acquire a first position and orientation of the measurement target object based on an association result; and
a second position and orientation acquiring unit configured to, based on the first position and orientation, associate a second geometric feature of the three-dimensional model for determining an orientation component in a rotating direction around a rotational center axis of the three-dimensional model with a second image feature corresponding to the second geometric feature, and acquire a second position and orientation of the measurement target object by updating the first position and orientation so that a distance between the second geometric feature and the second image feature that are associated with each other becomes small.

2. The information processing apparatus according to claim 1, wherein the first position and orientation are a position and orientation represented by position and orientation parameters of six degrees of freedom in an image coordinate system, wherein the image coordinate system is an image coordinate system of an image pickup apparatus with which the image is acquired.

3. The information processing apparatus according to claim 1, wherein the second position and orientation are a position and orientation represented by position and orientation parameters of three or fewer degrees of freedom based on a model coordinate system which is a model coordinate system based on the three-dimensional model.

4. The information processing apparatus according to claim 3, wherein the second position and orientation are a position and orientation which are represented by at least one of a rotation component of one degree of freedom based on the model coordinate system and a translation component of one degree of freedom.

5. The information processing apparatus according to claim 1, wherein the second position and orientation acquiring unit performs pattern matching by using an image of the second geometric feature of the three-dimensional model to acquire the second position and orientation of the three-dimensional model in a second coordinate system.

6. The information processing apparatus according to claim 1, wherein the second position and orientation acquiring unit acquires the second position and orientation by nonlinear optimization.

7. The information processing apparatus according to claim 1, wherein the second position and orientation acquiring unit acquires the second position and orientation from a simultaneous equation.

8. The information processing apparatus according to claim 1, wherein the image acquiring unit acquires, as the image of the measurement target object, at least one of a two-dimensional image and a depth map of the measurement target object.

9. The information processing apparatus according to claim 1, further comprising a model rotational center axis setting unit configured to set the rotational center axis of the three-dimensional model.

10. The information processing apparatus according to claim 9, where the model rotational center axis setting unit sets the rotational center axis of the three-dimensional model according to a user input.

11. The information processing apparatus according to claim 9, where the model rotational center axis setting unit comprises:
a first setting unit configured to select a basic face from among a plurality of planes forming the three-dimensional model and set a basic axis that is a rotational center axis of the basic face;
a second setting unit configured to select a reference face different from the basic face from among a plurality of planes which forms the three-dimensional model, and set a reference axis that is a rotational center axis of the reference face; and
a similarity calculating unit configured to calculate a similarity between an orientation of the basic axis and an orientation of the reference axis,
wherein the rotational center axis is set based on the similarity.

12. The information processing apparatus according to claim 11, wherein the first setting unit selects a plurality of basic faces and sets a plurality of basic axes that are rotational center axes of the plurality of basic faces;
wherein the second setting unit selects a plurality of the reference faces each for a different one of the plurality of the basic axes and sets a plurality of the reference axes that are rotational center axes of the plurality of selected reference faces;
wherein the similarity calculating unit calculates, for each of the plurality of the basic axes, a similarity in an orientation to a corresponding reference axis to obtain a plurality of similarities between the plurality of the basic axes and the plurality of the reference axes; and
wherein the model rotational center axis setting unit sets, as the rotational center axis, a basic axis corresponding to a highest evaluation value among evaluation values in which a plurality of similarities calculated for the plurality of basic axes are included.

13. The information processing apparatus according to claim 11, wherein the similarity calculating unit calculates a similarity between an orientation and a starting point position of the basic axis and an orientation and a starting point position of the reference axis.

14. The information processing apparatus according to claim 1, wherein the first position and orientation acquiring unit acquires the first position and orientation by calculating a position and orientation component other than the orientation component in a rotating direction around a rotational center axis; and wherein the second position and orientation acquiring unit acquires the second position and orientation by only calculating the orientation component in the rotating direction around the rotational center axis.

15. The information processing apparatus according to claim 1, wherein the three-dimensional model is three-dimensional computer aided design data.

16. The information processing apparatus according to claim 1, wherein the second geometric feature is selected from geometric features of the three-dimensional model in advance.

17. An information processing method comprising:

an image acquiring step of, by an image acquiring unit, acquiring an image of a measurement target object;

a first position and orientation acquiring step of, by a first position and orientation acquiring unit, associating a first geometric feature of a three-dimensional model with a first image feature corresponding to the first geometric feature within the image based on an approximate position and orientation of the measurement target object and acquiring a first position and orientation of the measurement target object based on an association result; and a second position and orientation acquiring step of, by a second position and orientation acquiring unit, based on the first position and orientation, associating a second geometric feature of the three-dimensional model for determining an orientation component in a rotating direction around a rotational center axis of the three-dimensional model with a second image feature corresponding to the second geometric feature, and acquiring a second position and orientation of the measurement target object by updating the first position and orientation so that a distance between the second geometric feature and the second image feature that are associated with each other becomes small.

18. A non-transitory storage medium storing a computer program for causing a computer to function as an information processing apparatus comprising:

an image acquiring unit configured to acquire an image of a measurement target object;

a first position and orientation acquiring unit configured to associate a first geometric feature of a three-dimensional model with a first image feature corresponding to the first geometric feature within the image based on an approximate position and orientation of the measurement target object and acquire a first position and orientation of the measurement target object based on an association result; and a second position and orientation acquiring unit configured to, based on the first position and orientation, associate a second geometric feature of the three-dimensional model for determining an orientation component in a rotating direction around a rotational center axis of the three-dimensional model with a second image feature corresponding to the second geometric feature, and acquire a second position and orientation of the measurement target object by updating the first position and orientation so that a distance between the second geometric feature and the second image feature that are associated with each other becomes small.

* * * * *